(12) United States Patent
Gao

(10) Patent No.: US 8,571,691 B2
(45) Date of Patent: *Oct. 29, 2013

(54) SCALING AND PARAMETERIZING A CONTROLLER

(75) Inventor: Zhiqiang Gao, Westlake, OH (US)

(73) Assignee: Cleveland State University, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/554,054

(22) Filed: Jul. 20, 2012

(65) Prior Publication Data

US 2013/0018487 A1  Jan. 17, 2013

Related U.S. Application Data

(62) Division of application No. 13/212,274, filed on Aug. 18, 2011, now Pat. No. 8,406,905, and a division of application No. 10/351,664, filed on Jan. 27, 2003, now Pat. No. 8,041,436.

(60) Provisional application No. 60/373,404, filed on Apr. 18, 2002.

(51) Int. Cl.
| | |
|---|---|
| G05B 1/06 | (2006.01) |
| G05B 13/00 | (2006.01) |
| G05B 13/02 | (2006.01) |
| G05B 15/00 | (2006.01) |

(52) U.S. Cl.
USPC ............ 700/37; 700/28; 700/32; 700/33; 700/42; 700/44; 700/45; 700/83; 318/561; 318/638

(58) Field of Classification Search
USPC ............ 700/28, 32, 33, 37, 42, 44, 45, 83; 318/561, 638
See application file for complete search history.

(56) References Cited

U.S. PATENT DOCUMENTS

| | | | |
|---|---|---|---|
| 3,543,010 A | 11/1970 | Dahlin | |
| 3,786,242 A | 1/1974 | Brooks | |
| 3,826,887 A | 7/1974 | Pemberton | |
| 4,481,567 A | 11/1984 | Kaya et al. | |
| 4,768,143 A | 8/1988 | Lane et al. | |

(Continued)

FOREIGN PATENT DOCUMENTS

| | | |
|---|---|---|
| WO | 0041043 A1 | 7/2000 |
| WO | 2007035559 | 3/2007 |

OTHER PUBLICATIONS

International Search Report and Written Opinion for application No. PCT/US06/036156 dated Mar. 17, 2009, 8 pages.

(Continued)

*Primary Examiner* — Mohammad Ali
*Assistant Examiner* — Jennifer L Norton
(74) *Attorney, Agent, or Firm* — Turocy & Watson, LLP

(57) ABSTRACT

Controller scaling and parameterization are described. Techniques that can be improved by employing the scaling and parameterization include, but are not limited to, controller design, tuning and optimization. The scaling and parameterization methods described here apply to transfer function based controllers, including PID controllers. The parameterization methods also applies to state feedback and state observer based controllers, as well as linear active disturbance rejection controllers. It is emphasized that this abstract is provided to comply with the rules requiring an abstract that will allow a searcher or other reader to quickly ascertain the subject matter of the application. It is submitted with the understanding that it will not be used to interpret or limit the scope or meaning of the claims.

20 Claims, 18 Drawing Sheets

(56) References Cited

U.S. PATENT DOCUMENTS

| | | | |
|---|---|---|---|
| 5,229,699 | A | 7/1993 | Chu et al. |
| 5,369,345 | A | 11/1994 | Phan et al. |
| 5,397,973 | A | 3/1995 | Dummermuth |
| 5,404,289 | A | 4/1995 | Hang et al. |
| 5,680,304 | A | 10/1997 | Wang et al. |
| 5,684,375 | A | 11/1997 | Chaffee et al. |
| 5,742,503 | A | 4/1998 | Yu |
| 5,805,447 | A | 9/1998 | Teng et al. |
| 6,122,555 | A | 9/2000 | Lu |
| 6,128,541 | A | 10/2000 | Junk |
| 6,195,982 | B1 | 3/2001 | Gysling et al. |
| 6,198,246 | B1 | 3/2001 | Yutkowitz |
| 6,445,962 | B1 | 9/2002 | Blevins et al. |
| 6,510,353 | B1 | 1/2003 | Gudaz et al. |
| 6,546,295 | B1 | 4/2003 | Pyotsia et al. |
| 6,564,194 | B1 | 5/2003 | Koza et al. |
| 6,631,299 | B1 | 10/2003 | Patel et al. |
| 6,658,305 | B1 | 12/2003 | Gudmundsson et al. |
| 6,980,869 | B1 | 12/2005 | Chandhoke |
| 7,024,253 | B2 | 4/2006 | Gaikwad et al. |
| 7,149,591 | B2 | 12/2006 | Gao et al. |
| 7,346,402 | B1 | 3/2008 | Stahl |
| 7,865,254 | B2 | 1/2011 | Gahinet et al. |
| 8,180,464 | B2 | 5/2012 | Gao et al. |
| 2003/0139825 | A1 | 7/2003 | Lund |
| 2003/0199997 | A1 | 10/2003 | Gao |
| 2007/0073422 | A1 | 3/2007 | Gaikwad et al. |
| 2007/0088448 | A1 | 4/2007 | Mylaraswamy et al. |

OTHER PUBLICATIONS

Gao, et al., "A Stable Self-Tuning Fuzzy Logic Control System for Industrial Temperature Regulation," IEEE Transactions on Industry Applications, vol. 38, No. 2, pp. 414-424, Mar./Apr. 2002.

Hu, et al., "A Time-Optimal Unified Servo Control Method With a Two-Degree-Of Freedom Structure for a Hard Disk Drive," 2005 American Control Conference Jun. 8-10, 2005, Portland, OR. 6 pages.

Gao, Active Disturbance Rejection Control: A Paradigm Shift in Feedback Control System Design, Proceedings of the 2006 American Control Conference, Mineapolis, Minnesota, pp. 2399-2405, Jun. 14-16, 2006.

Miklosovic, et al., "Discreet Implementation and Generalization of the Extended State Observer", Proceedings of the 2006 American Control Conference Minneapolis, Minnesota, pp. 2209-2214, Jun. 14-16, 2006.

Canadian OA for Canadian Application No. 2,663,742 dated Jun. 9, 2012, 2 pages.

Indian Office Action for Indian Application No. 759/MUMNP/2008, dated Feb. 15, 2012, 2 pages.

Chinese OA dated Jan. 10, 2013 for Chinese Patent Application No. 201110136608.3, 7 pages.

U.S. Office Action for U.S. Appl. No. 10/351,664 mailed on Sep. 8, 2006.

Ghanekar, et al. Scaling Laws for Frequency Domain Controllers of Dynamically Equivalent Single Flexible Link Manipulators, IEEE vol. 1, pp. 919-924, Proceedings of Int'l conf. on Robotics and Automation, Nagoya, Japan, May 21-27, 1995.

Ghanekar, et al. Scaling Laws for Linear Controllers of Flexible Link Manipulators Characterized by Nondimensional Groups, IEEE Transactions on Robotics and automation, IEEE Inc., NY vol. 13, No. 1, pp. 117-127, 1997.

Suh. New PID Identification Algorithm Based on Frequency Scaling, IEEE, Proc. of 40th Midwest Symposium, Sacramento, CA, pp. 654-658, 1997.

U.S. Office Action for U.S. Appl. No. 10/351,664 mailed on May 1, 2007.

U.S. Office Action for U.S. Appl. No. 10/351,664 mailed on Nov. 14, 2007.

U.S. Office Action for U.S. Appl. No. 10/351,664 mailed on Nov. 21, 2008.

U.S. Office Action for U.S. Appl. No. 10/351,664 mailed on Jul. 31, 2009.

U.S. Office Action for U.S. Appl. No. 10/351,664 mailed on Apr. 12, 2010.

U.S. Office Action for U.S. Appl. No. 10/351,664 mailed on Mar. 3, 2011.

Aaron, M.R. Synthesis of Feedback Control Systems by Means of Pole and Zero Location of the Closed Loop Function, Transactions of the American Institute of Electrical Engineers, vol. 70, 1951, pp. 1439-1446.

Gao, et al. A Novel Motion Control Design Approach Based on Active Disturbance Rejection, Proceedings of the 40th IEEE Conference on Decision and Control, 2001, pp. 4877-1882.

McIntosh, A.R., et al. Selection of Tuning Parameters for Adaptive Generalized Predictive Control, American Control Conference, pp. 1846-1851, American Control Conference, Alberta, Canada, Jun. 21-23, 1989.

Kristiansson, B. et al. Robust and optimal tuning of PI and PID controllers, IEE Proceedings—Control Theory and Applicaitons, vol. 149, Issue 1, pp. 17-25, 2002.

Zhiqiang, Gao. Scaling and Bandwith-Parameterization Based Controller Tuning, pp. 4989-4996, Proceedings of the American Control Conference, Denver, Colorado, Jun. 4-6, 2003.

United States Office Action for U.S. Appl. No. 13/212,274 mailed on Mar. 14, 2012.

Office Action dated Jun. 12, 2013, for U.S. Appl. No. 13/464,558, 51 pages.

Prior Art Fig. 1

SCALING AND PARAMETERIZING A CONTROLLER

CROSS REFERENCE TO RELATED APPLICATIONS

This application is a Division of application Ser. No. 13/212,274 filed Aug. 18, 2011, which is a Division of application Ser. No. 10/351,664 filed Jan. 27, 2003, which claims the benefit of U.S. Provisional Application 60/373,404 filed Apr. 8, 2002, the entire contents of all of which are hereby incorporated herein by reference.

TECHNICAL FIELD

The systems, methods, application programming interfaces (API), graphical user interfaces (GUI), computer readable media, and so on described herein relate generally to controllers and more particularly to scaling and parameterizing controllers, which facilitates improving controller design, tuning, and optimizing.

BACKGROUND

A feedback (closed-loop) control system 100, as shown in Prior Art FIG. 1, is widely used to modify the behavior of a physical process, denoted as the plant 110, so it behaves in a specific desirable way over time. For example, it may be desirable to maintain the speed of a car on a highway as close as possible to 60 miles per hour in spite of possible hills or adverse wind; or it may be desirable to have an aircraft follow a desired altitude, heading and velocity profile independently of wind gusts; or it may be desirable to have the temperature and pressure in a reactor vessel in a chemical process plant maintained at desired levels. All these are being accomplished today by using feedback control, and the above are examples of what automatic control systems are designed to do, without human intervention.

The key component in a feedback control system is the controller 120, which determines the difference between the output of the plant 110, (e.g., the temperature) and its desired value and produces a corresponding control signal u (e.g., turning a heater on or off). The goal of controller design is usually to make this difference as small as possible as soon as possible. Today, controllers are employed in a large number of industrial control applications and in areas like robotics, aeronautics, astronautics, motors, motion control, thermal control, and so on.

Classic Controllers:

Classic Control Theory provides a number of techniques an engineer can use in controller design. Existing controllers for linear, time invariant, and single-input single output plants can be categorized into three forms: the proportional/integral/derivative (PID) controllers, transfer function based (TFB) controllers, and state feedback (SF) controllers. The PID controller is defined by the equation $$u = K_P e + K_I \int e + K_D \dot{e} \quad (1)$$

where u is the control signal and e is the error between the setpoint and the process output being controlled. This type of controller has been employed in engineering and other applications since the early 1920s. It is an error based controller that does not require an explicit mathematical model of the plant. The TFB controller is given in the form of $$U(s) = G_c(s)E(s), \quad G_c(s) = \frac{n(s)}{d(s)} \quad (2)$$

where U(s) and E(s) are Laplace Transforms of u and e defined above, and n(s) and d(s) are polynomials in s. The TFB controller can be designed using methods in control theory based on the transfer function model of the plant, $G_p(s)$. A PID controller can be considered a special case of a TFB controller because it has an equivalent transfer function of $$G_c(s) = k_p + \frac{k_i}{s} + k_d s \quad (3)$$

The State Feedback (SF) Controller

The SF controller can be defined by $$u = r + K\hat{x} \quad (4)$$

and is based on the state space model of the plant:

$$\dot{x}(t) = Ax(t) + Bu(t), y(t) = Cx(t) + Du(t) \quad (5)$$

When the state x is not accessible, a state observer (SO):

$$\dot{\hat{x}} = A\hat{x} + Bu + L(y - \hat{y}) \quad (6)$$

is often used to find its estimate, $\hat{x}$. Here r is the setpoint for the output to follow.

In addition to the above controllers, a more practical controller is the recently developed Active Disturbance Rejection Controller (ADRC). Its linear form (LADRC) for a second order plant is introduced below as an illustration. The unique distinction of ADRC is that it is largely independent of the mathematical model of the plant and is therefore better than most controllers in performance and robustness in practical applications.

Linear Activated Disturbance Rejection Controller (LADRC)

Consider an example of controlling a second order plant $$\ddot{y} = -a\dot{y} - by + w + bu \quad (7)$$

where y and u are output and input, respectively, and w is an input disturbance. Here both parameters, a and b, are unknown, although there is some knowledge of b, (e.g., $b_0 \approx b$, derived from the initial acceleration of y in step response). Rewrite (7) as $$\ddot{y} = -a\dot{y} - by + w + (b - b_0)u + b_0 u = f + b_0 u \quad (8)$$

where $f = -a\dot{y} - by + w + (b - b_0)u$. Here $f$ is referred to as the generalized disturbance, or disturbance, because it represents both the unknown internal dynamics, $-a\dot{y} - by + (b - b_0)u$ and the external disturbance w(t).

If an estimate of $f$, $\hat{f}$ can be obtained, then the control law $$u = \frac{-\hat{f} + u_0}{b_0}$$

reduces the plant to $\ddot{y} = (f - \hat{f}) + u_0$, which is a unit-gain double integrator control problem with a disturbance $(f - \hat{f})$.

Thus, rewrite the plant in (8) in state space form as $$\begin{cases} \dot{x}_1 = x_2 \\ \dot{x}_2 = x_3 + b_0 u \\ \dot{x}_3 = h \\ y = x_1 \end{cases} \quad (9)$$

with $x_3 = f$ added as an augmented state, and $h = \dot{f}$ is seen as an unknown disturbance. Now $f$ can be estimated using a state observer based on the state space model $$\dot{x} = Ax + Bu + Eh$$

$$y = Cz \quad (10)$$

where $$A = \begin{bmatrix} 0 & 1 & 0 \\ 0 & 0 & 1 \\ 0 & 0 & 0 \end{bmatrix}, B = \begin{bmatrix} 0 \\ b_0 \\ 0 \end{bmatrix}, C = [1\ 0\ 0], E = \begin{bmatrix} 0 \\ 0 \\ 1 \end{bmatrix}$$

Now the state space observer, denoted as the linear extended state observer (LESO), of (10) can be constructed as $$\dot{z} = Az + Bu + L(y - \hat{y})$$

$$\hat{y} = Cz \quad (11)$$

which can be reconstructed in software, for example, and L is the observer gain vector, which can be obtained using various methods known in the art like pole placement, $$L = [\beta_1 \beta_2 \beta_3]^T \quad (12)$$

where $[\ ]^T$ denotes transpose. With the given state observer, the control law can be given as:

$$u = \frac{-z_3 + u_0}{b_0} \quad (13)$$

Ignoring the inaccuracy of the observer, $$\ddot{y} = (f - z_3) + u_0 \approx u_0 \quad (14)$$

which is an unit gain double integrator that can be implemented with a PD controller $$u_0 = k_p(r - z_1) - k_d z_2 \quad (15)$$

Controller Tuning

Over the years, the advances in control theory provided a number of useful analysis and design tools. As a result, controller design moved from empirical methods (e.g., ad hoc tuning via Ziegler and Nichols tuning tables for PID) to analytical methods (e.g., pole placement). The frequency response method (Bode and Nyquist plots) also facilitated analytical control design.

Conventionally, controllers are individually designed according to design criteria and then individually tuned until they exhibit an acceptable performance. Practicing engineers may design controllers, (e.g., PID) using look-up tables and then tune the controllers using trial and error techniques. But each controller is typically individually designed, tuned, and tested.

Tuning controllers has perplexed engineers. Controllers that are developed based on a mathematical model of the plant usually need their parameters to be adjusted, or "tuned" as they are implemented in hardware and tested. This is because the mathematical model often does not accurately reflect the dynamics of the plant. Determining appropriate control parameters under such circumstances is often problematic, leading to control solutions that are functional but ill-tuned, yielding lost performance and wasted control energy. Additionally, and/or alternatively, engineers design using analytical (e.g., pole placement) techniques, but once again tune with trial and error techniques. Since many industrial machines and engineering applications are built to be inherently stable, acceptable controllers can be designed and tuned using these conventional techniques, however, acceptable performance may not approach optimal performance.

One example conventional technique for designing a PID controller included obtaining an open-loop response and determining what, if anything, needed to be improved. By way of illustration, the designer would build a candidate system with a feedback loop, guess the initial values of the three gains (e.g., $k_p$, $k_d$, $k_i$) in PID and observe the performance in terms of rise time, steady state error and so on. Then, the designer might modify the proportional gain to improve rise time. Similarly, the designer might add or modify a derivative controller to improve overshoot and an integral controller to eliminate steady state error. Each component would have its own gain that would be individually tuned. Thus, conventional designers often faced choosing three components in a PID controller and individually tuning each component. Furthermore, there could be many more parameters that the design engineer must tune if a TFB or a state feedback state observer (SFSOB) controller is employed.

Another observation of control design is that it is not portable. That is, each control problem is solved individually and its solution cannot be easily modified for another control problem. This means that the tedious design and tuning process must be repeated for each control problem.

Thus, having reviewed controllers, the application now describes example systems and methods related to controllers.

SUMMARY

This section presents a simplified summary of methods, systems, computer readable media and so on for scaling and parameterizing controllers to facilitate providing a basic understanding of these items. This summary is not an extensive overview and is not intended to identify key or critical elements of the methods, systems, computer readable media, and so on or to delineate the scope of these items. This summary provides a conceptual introduction in a simplified form as a prelude to the more detailed description that is presented later.

The application describes scaling and parameterizing controllers. With these two techniques, controller designing, tuning, and optimizing can be improved. In one example, systems, methods, and so on described herein facilitate reusing a controller design by scaling a controller from one application to another. This scaling may be available, for example, for applications whose plant differences can be detailed through frequency scale and/or gain scale. While PID controllers are used as examples, it is to be appreciated that other controllers can benefit from scaling and parameterizing as described herein.

Those familiar with filter design understand that filters may be designed and then scaled for use in analogous applications. Filter designers are versed in the concept of the unit filter which facilitates scaling filters. In example controller scaling techniques, a plant transfer function is first reduced to a unit gain and unit bandwidth (UGUB) form. Then, a known controller for an appropriate UGUB plant is scaled for an analogous plant. Since certain plants share certain characteristics, classes of UGUB plants can be designed for which corresponding classes of scaleable, parameterizable controllers can be designed.

Since certain classes of plants have similar properties, it is possible to frequency scale controllers within classes. For example, an anti-lock brake plant for a passenger car that weighs 2000 pounds may share a number of characteristics with an anti-lock brake plant for a passenger car that weighs 2500 pounds. Thus, if a UGUB plant can be designed for this class of cars, then a frequency scaleable controller can also be designed for the class of plants. Then, once a controller has been selected and engineered for a member of the class (e.g., the 2000 pound car), it becomes a known controller from which other analogous controllers can be designed for other similar cars (e.g., the 2500 pound car) using frequency scaling.

This scaling method makes a controller "portable". That is a single controller can be used as the "seed" to generate controllers for a large number of different plants that are similar in nature. The remaining question concerns how to account for differences in design requirements. Controller parameterization addresses this issue. The example parameterization techniques described herein make controller coefficients functions of a single design parameter, namely the crossover frequency (also known as the bandwidth). In doing so, the controller can be tuned for different design requirements, which is primarily reflected in the bandwidth requirement.

The combination of scaling and parameterization methods means that an existing controller (including PID, TFB, and SFSOB) can be scaled for different plants and then, through the adjustment of one parameter, changed to meet different performance requirements that are unique in different applications.

Certain illustrative example methods, systems, computer readable media and so on are described herein in connection with the following description and the annexed drawings. These examples are indicative, however, of but a few of the various ways in which the principles of the methods, systems, computer readable media and so on may be employed and thus are intended to be inclusive of equivalents. Other advantages and novel features may become apparent from the following detailed description when considered in conjunction with the drawings.

BRIEF DESCRIPTION OF THE DRAWINGS

Prior Art

LEXICON

Figure 1:
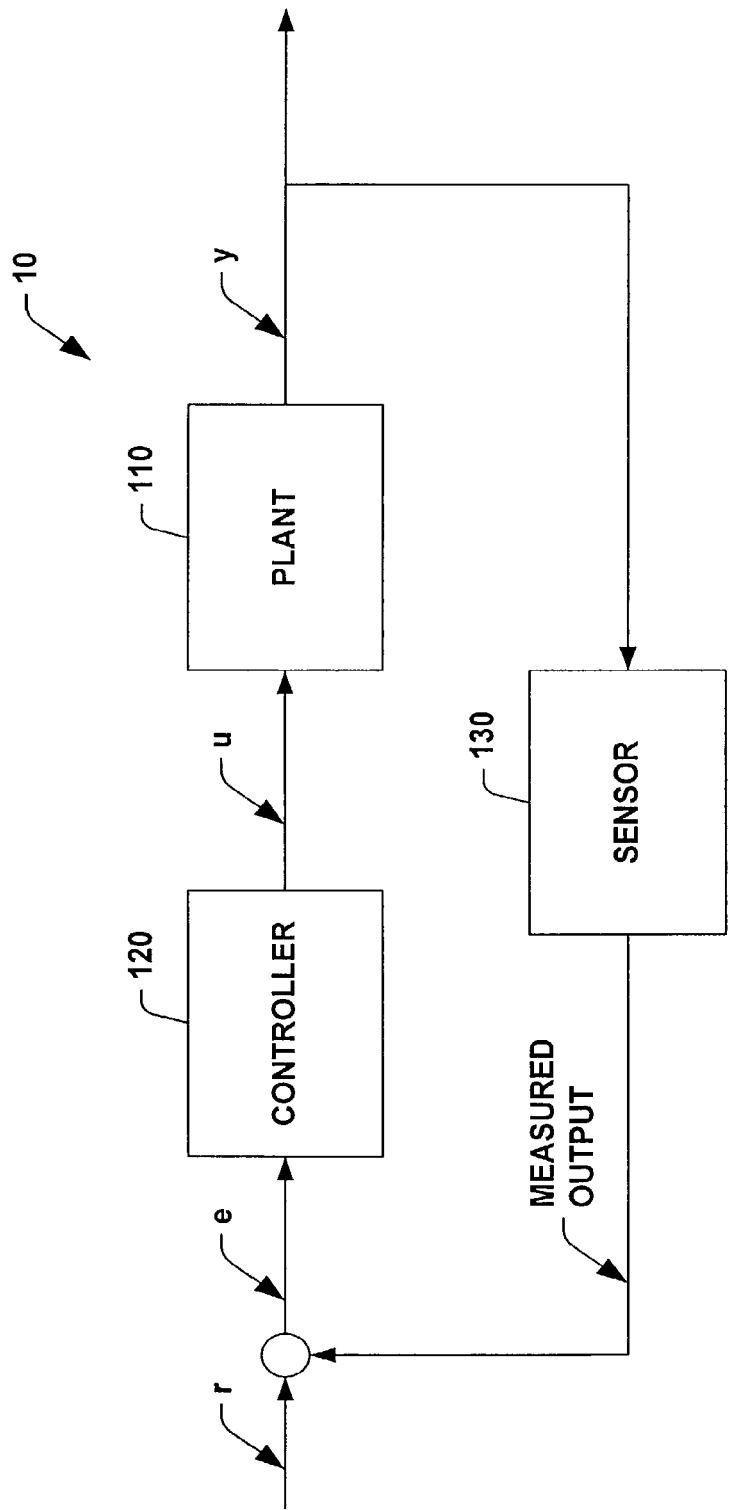
FIG. 1 illustrates the configuration of an output feedback control system.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program and a computer. By way of illustration, both an application running on a server and the server can be computer components. One or more computer components can reside within a process and/or thread of execution and a computer component can be localized on one computer and/or distributed between two or more computers.

"Computer communications", as used herein, refers to a communication between two or more computers and can be, for example, a network transfer, a file transfer, an applet transfer, an email, a hypertext transfer protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Logic", as used herein, includes but is not limited to hardware, fhinware, software and/or combinations of each to perform a function(s) or an action(s). For example, based on a desired application or needs, logic may include a software controlled microprocessor, discrete logic such as an application specific integrated circuit (ASIC), or other programmed logic device. Logic may also be fully embodied as software.

An "operable connection" is one in which signals and/or actual communication flow and/Or logical communication flow may be sent and/or received. Usually, an operable connection includes a physical interface, an electrical interface, and/or a data interface, but it is to be noted that an operable connection may consist of differing combinations of these or other types of connections sufficient to allow operable control.

"Signal", as used herein, includes but is not limited to one or more electrical or optical signals, analog or digital, one or more computer instructions, a bit or bit stream, or the like.

"Software", as used herein, includes but is not limited to, one or more computer readable and/or executable instructions that cause a computer or other electronic device to perform functions, actions and/or behave in a desired manner. The instructions may be embodied in various forms like routines, algorithms, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel processing computer components and thus can be loaded and/or executed in serial, parallel, massively parallel and other manners. It will be appreciated by one of ordinary skill in the art that the foini of software may be dependent on, for example, requirements of a desired application, the environment in which it runs, and/or the desires of a designer/programmer or the like.

"Data store", as used herein, refers to a physical and/or logical entity that can store data. A data store may be, for example, a database, a table, a file, a list, a queue, a heap, and so on. A data store may reside in one logical and/or physical entity and/or may be distributed between two or more logical and/or physical entities.

To the extent that the term "includes" is employed in the detailed description or the claims, it is intended to be inclusive in a manner similar to the term "comprising" as that term is interpreted when employed as a transitional word in a claim.

To the extent that the term "or" is employed in the claims (e.g., A or B) it is intended to mean "A or B or both". When the author intends to indicate "only A or B but not both", then the author will employ the term "A or B but not both". Thus, use of the term "or" in the claims is the inclusive, and not the exclusive, use. See BRYAN A. GARNER, A DICTIONARY OF MODERN LEGAL USAGE 624 (2d Ed. 1995).

DETAILED DESCRIPTION

Example methods, systems, computer media, and so on are now described with reference to the drawings, where like reference numerals are used to refer to like elements throughout. In the following description for purposes of explanation, numerous specific details are set forth in order to facilitate thoroughly understanding the methods, systems, computer readable media, and so on. It may be evident, however, that the methods, systems and so on can be practiced without these specific details. In other instances, well-known structures and devices are shown in block diagram form in order to simplify description.

Scaling:

Controllers typically are not scalable and thus are not portable between applications. However, controllers can be made portable via scaling as described in the example systems and methods provided herein. In general, a plant mathematically represented by a transfer function $G_p(s)$, (where s is the Laplace Transform variable) can be scaled according to:

$$\overline{G}_p(s) = kG_p(s/\omega_p) \quad (16)$$

where $\omega_p$ is the plant frequency scale and k is the gain scale, to represent a large number of plants that differ from the original plant by a frequency scale, $\omega_p$, and a gain scale, k.

Then, a corresponding controller $\overline{G}_c(s)$ for the plant $\overline{G}_p(s)$ can be scaled according to:

$$\overline{G}_c(s) = (1/k)G_c(s/\omega_p). \quad (17)$$

Figure 2:
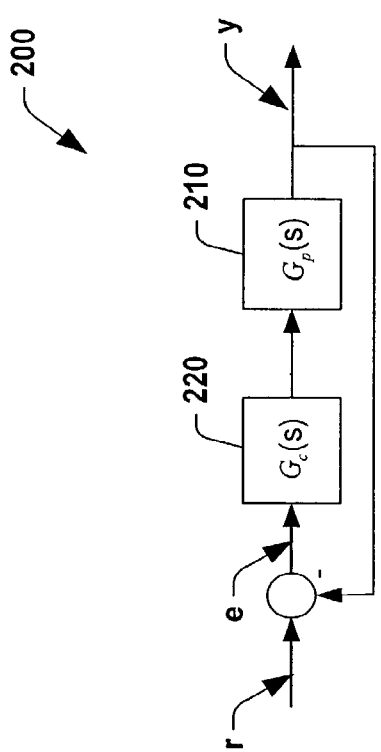
FIG. 2 illustrates a feedback control configuration.

Consider a unit feedback control system 200 with the plant $G_p(s)$ 210 and controller $G_c(s)$ 220, as shown in FIG. 2. Assume that $G_c(s)$ 220 was designed with desired command following, disturbance rejection, noise rejection, and stability robustness. Now, consider a similar class of plants $kG_p(s/\omega_p)$. For given $\omega_p$, using example systems and methods described herein, a suitable controller can be produced through frequency scaling. Thus define $\omega_p$ as the frequency scale and k as the gain scale of the plant $G_p(s/\omega_p)$ with respect to $$G_p(s). \quad (18)$$

Then $$\overline{G}_c(s) = (1/k)G_c(s/\omega_p). \quad (19)$$

Figure 3:
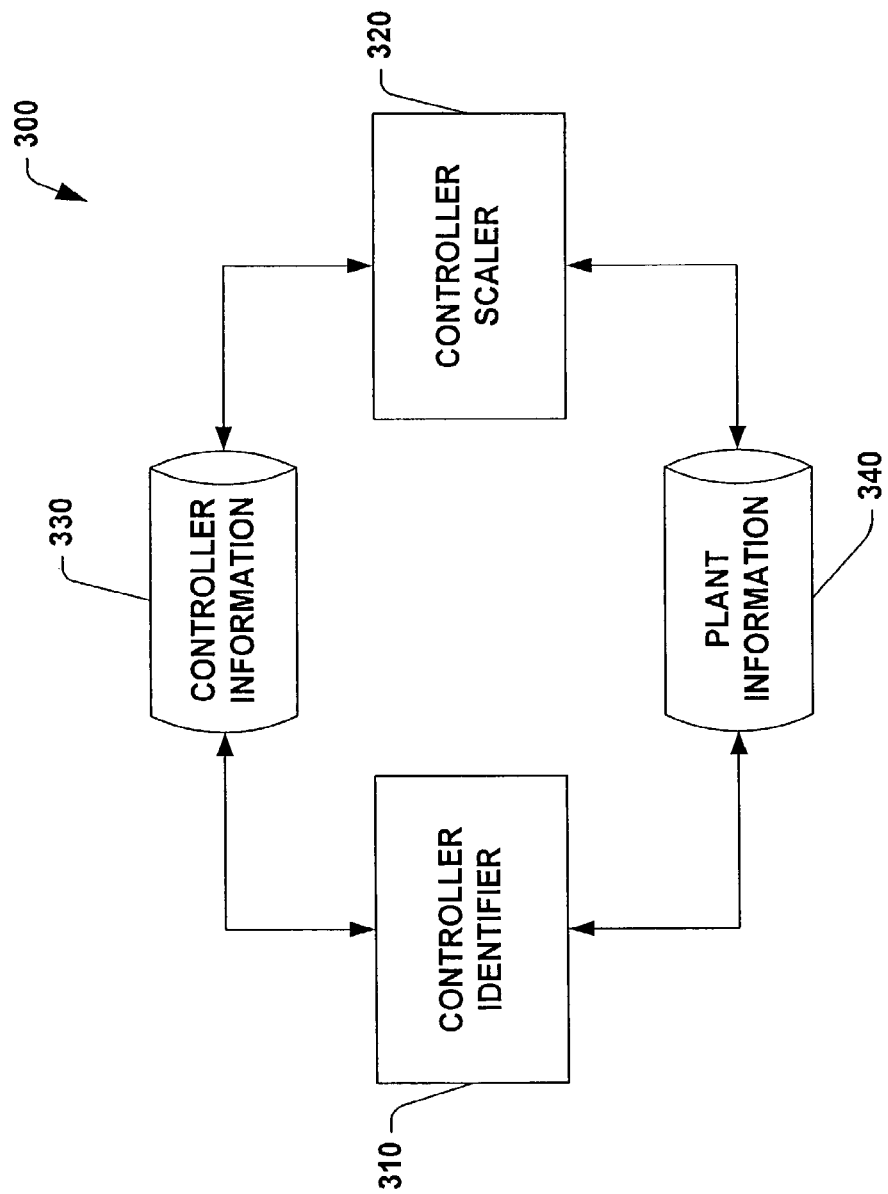
FIG. 3 illustrates an example controller production system.

Referring to FIG. 3, an example system 300 that employs frequency scaling is illustrated. The system 300 includes a controller identifier 310 that can identify a known controller associated with controlling a known plant. The controller may have one or more scaleable parameters (e.g., frequency, gains) that facilitate scaling the controller. The controller identifier 310 may access a controller information data store 330 and/or a plant information data store 340 to facilitate characterizing one or more properties of the known controller. By way of illustration, the controller identifier 310 may identify the frequency scale of the controller ($\omega_c$) and/or the frequency scale ($\omega_p$) and transfer function (s) of a plant controlled by the known controller.

The controller information data store 330 may store, for example, controller class information and/or information concerning scaleable controller parameters. Similarly, the plant data store 34Q may store, for example, plant information like transfer function shape, frequency scale, and so on.

The system 300 may also include a controller scaler 320 that produces a scaled controller from the identified scaleable parameter. The scaler 320 may make scaling decisions based, for example, on information in the controller information data store 330 (e.g., controller class, scaleable parameters, frequency scale), information in the plant information data store 340 (e.g. plant class, plant transfer function, frequency scale), and so on.

While illustrated as two separate entities, it is to be appreciated that the identifier 310 and scaler 320 could be implemented in a single computer component and/or as two or more distributed, communicating, co-operating computer components. Thus, the entities illustrated in FIG. 3 may communicate through computer communications using signals, carrier waves, data packets, and so on. Similarly, while illustrated as two separate data stores, the controller information data store 330 and the plant information data store 340 may be implemented as a single data store and/or distributed between two or more communicating, co-operating data stores.

Aspects of controller scaling can be related to filter design. In filter design, with the bandwidth, the pass band, and stop band requirements given, filter design is straight forward. An example filter design method includes finding a unit bandwidth filter, such as an nth order Chebeshev filter H(s), that meets the pass band and stop band specifications and then frequency scaling the filter as $H(s/\omega_0)$ to achieve a bandwidth of $\omega_0$.

Revisiting the system 200 in FIG. 2, to facilitate understanding frequency scaling and time scaling as related to controllers, denote $\omega_p$ as the frequency scale of the plant $G_p(s/\omega_p)$ with respect to $G_p(s)$ 210, and $\tau_p = 1/\omega_p$, the corresponding time scale. Then denote k as the gain scale of the plant $kG_p(s)$ with respect to $G_p(s)$ 210. With these definitions in hand, differences in example industrial control problems can be described in terms of the frequency and gain scales. For example, temperature processes with different time constants (in first order transfer functions), motion control problems with different inertias, motor sizes, frictions, and the like can be described in terms of the defined frequency and gain scales.

These scales facilitate paying less attention to differences between controllers and applications and more attention to a generic solution for a class of problems because using the scales facilitates reducing linear time invariant plants, proper and without a finite zero, to one of the following example forms:

$$\frac{1}{s+1}, \frac{1}{s}, \frac{1}{s^2 + 2\xi s + 1}, \frac{1}{s(s+1)}, \frac{1}{s^2}, \frac{1}{s^3 + \xi_1 s^2 + \xi_2 s + 1}, \ldots \quad (22)$$

through gain and frequency scaling. For example, the motion control plant of $G_p(s)=23.2/s(s+1.41)$ is a variation of a generic motion control plant $G_p(s)=1/s(s+1)$ with a gain factor of $k=11.67$ and $\omega_p=1.41$.

$$\frac{23.2}{s(s+1.41)} = \frac{11.67}{\frac{s}{1.41}\left(\frac{s}{1.41}+1\right)} \quad (23)$$

Equation (22) describes many example industrial control problems that can be approximated by a first order or a second order transfer function response. Additionally, equation (22) can be appended by terms like:

$$\frac{s+1}{s^2+2\xi s+1}, \frac{s^2+2\xi_z s+1}{s^3+\xi_1 s^2+\xi_2 s+1}, \cdots \quad (24)$$

to include systems with finite zeros. Thus, while a set of examples is provided in equations (22) and (24), it is to be appreciated that a greater and/or lesser number of forms can be employed in accordance with the systems and methods described herein. Furthermore, in some examples, scaling can be applied to reflect the unique characteristics of certain problems. For example, a motion control system with significant resonant problems can be modeled and scaled as $$\frac{k}{\frac{s}{\omega_p}\left(\frac{s}{\omega_p}+1\right)\left(\frac{s}{\omega_{rp}}\right)^2+2\xi_p\frac{s}{\omega_{rp}}+1} \cdot \frac{\left(\frac{s}{\omega_{rz}}\right)^2+2\xi_z\frac{s}{\omega_{rz}}+1}{1} \quad (25)$$

scaling $\Downarrow$ $$\frac{1}{s(s+1)} \cdot \frac{\left(\frac{s}{m}\right)^2+2\xi_z\frac{s}{m}+1}{\left(\frac{s}{n}\right)^2+2\xi_p\frac{s}{n}+1}$$

where the resonant frequencies satisfy $\omega_{rp}=n\omega_p$, $\omega_{rz}=m\omega_p$. Problems with multiple frequency scales, $\omega_p$, $n\omega_p$, and $m\omega_p$, can be referred to as multi-scale problems. With these definitions in hand, an example controller scaling technique is now described.

Assume $G_c(s)$ is a stabilizing controller for plant $G_p(s)$, and the loop gain crossover frequency is $\omega_c$, then the controller $$\overline{G}_c(s)=G_c(s/\omega_p)/k \quad (26)$$

will stabilize the plant $\overline{G}_p(s)=kG_{p1}(s/\omega_p)$. The new controller new loop gain $$\overline{L}(s)=\overline{G}_p(s)\overline{G}_c(s) \quad (27)$$

will have a bandwidth of $\omega_c\omega_p$, and substantially the same stability margins of $$L(s)=G_p(s)G_c(s)$$

since $$\overline{L}(s)=L(s/\omega_p).$$

Note that the new closed-loop system has substantially the same frequency response shape as the original system except that it is shifted by $\omega_p$. Thus, feedback control properties like bandwidth, disturbance and noise rejection are retained, as is the stability robustness, from the previous design, except that frequency ranges are shifted by $\omega_p$.

Now that controller scaling has been described, PID scaling can be addressed.

According to the frequency scale principle discussed above, and assuming the original controller for $G_p(s)$ is a PID, e.g., $$G_c(s) = k_p + \frac{k_i}{s} + k_d s \quad (28)$$

then the new controller for the plant $kG_p(s/\omega_p)$ is obtained from (28) as $$G_c(s) = \left(k_p + k_i\frac{\omega_p}{s} + k_d\frac{s}{\omega_p}\right)/k \quad (29)$$

That is, the new PID gains, $\overline{k}_p$, $\overline{k}_i$, and $\overline{k}_d$ are obtained from the original ones as $$\overline{k}_p = \frac{k_p}{k}, \overline{k}_i = \frac{k_i\omega_p}{k}, \overline{k}_d = \frac{k_d}{k\omega_p} \quad (30)$$

To demonstrate the practical application and tangible results possible from the method described above, in the following example, consider a plant that has a transfer function of $$G_p(s) = \frac{1}{s^2+s+1}$$

and the PID control gains of $k_p=3$, $k_i=1$, and $k_d=2$. Now, assume the plant has changed to $$G_p(s) = \frac{1}{\left(\frac{s}{10}\right)^2+\frac{s}{10}+1}$$

The new gains are calculated from equation (30) as $\overline{k}_p=3$, $\overline{k}_i=10$, $\overline{k}_d=0.2$. Thus, rather than having to build, design, and tune the controller for the plant $$G_p(s) = \frac{1}{\left(\frac{s}{10}\right)^2+\frac{s}{10}+1}$$

from scratch, the HD designer was able to select an existing PID appropriate for the PLD class and scale the PID. Thus, frequency scaling facilitates new systems and methods for controller design that take advantage of previously designed controllers and the relationships between controllers in related applications.

In one example, the controller is a PID controller. The PID controller may have a plant frequency scale $\omega_p$ as a scaleable parameter. In another example, the method includes producing the scaled controller. For example, a computer component may be programmed to perform the frequency scaled controlling. Additionally, computer executable portions of the method may be stored on a computer readable medium and/or be transmitted between computer components by, for example, carrier waves encoding computer executable instructions.

In view of the exemplary systems shown and described below, example methodologies that are implemented will be better appreciated with reference to the flow diagrams of FIGS. 4, 5 and 13. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks. In one example, methodologies are implemented as computer executable instructions and/or operations, stored on computer readable media including, but not limited to an application specific integrated circuit (ASIC), a compact disc (CD), a digital versatile disk (DVD), a random access memory (RAM), a read only memory (ROM), a programmable read only memory (PROM), an electronically erasable programmable read only memory (EEPROM), a disk, a carrier wave, and a memory stick.

In the flow diagrams, rectangular blocks denote "processing blocks" that may be implemented, for example, in software. Similarly, the diamond shaped blocks denote "decision blocks" or "flow control blocks" that may also be implemented, for example, in software. Alternatively, and/or additionally, the processing and decision blocks can be implemented in functionally equivalent circuits like a digital signal processor (DSP), an ASIC, and the like.

A flow diagram does not depict syntax for any particular programming language, methodology, or style (e.g., procedural, object-oriented). Rather, a flow diagram illustrates functional information one skilled in the art may employ to program software, design circuits, and so on. It is to be appreciated that in some examples, program elements like temporary variables, initialization of loops and variables, routine loops, and so on are not shown.

Figure 5:
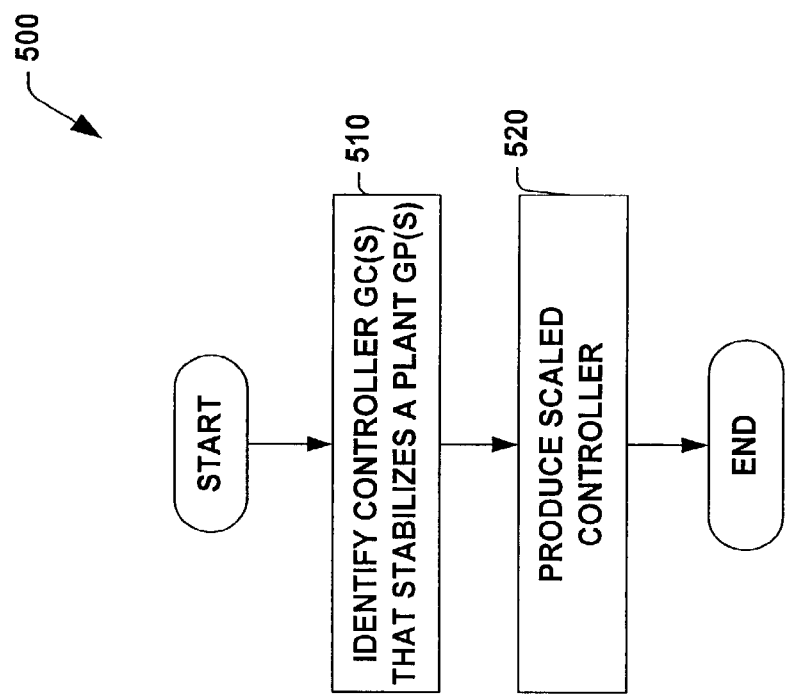
FIG. 5 illustrates an example controller scaling method.

Turning to FIG. 5, a flowchart for an example method 500 for producing a controller is illustrated. The method 500 includes, at 510, identifying a controller $G_c(s)$ that stabilizes a plant $G_p(s)$ where the controller has a frequency $\omega_c$ and, at 520, producing a controller $\overline{G}_c(s)$ by scaling the controller $G_c(s)$ according to $\overline{k}_c(s) = G_c(s/\omega_p)/k$, where the controller $\overline{G}_c(s)$ will stabilize the plant $\overline{G}_p(s) = kG_{p1}(s/\omega_p)$, where $\omega_p$ is the frequency scale of the plant $G_p(s/\omega_p)$, and where k is the gain scale of the plant $kG_p(s)$. In one example, the controller is a PID controller of the form $$G_c(s) = k_p + \frac{k_i}{s} + k_d s,$$

where $k_p$ is a proportional gain, $k_i$ is an integral gain, and $k_d$ is a derivative gain. In another example, $$G_c(s) = \left( k_p + k_i \frac{\omega_p}{s} + k_d \frac{s}{\omega_p} \right) / k.$$

In yet another example, the PID gains $\overline{k}_p$, $\overline{k}_i$, and $\overline{k}_d$ are obtained from the $k_p$, $k_i$, and $k_d$ according to $$\overline{k}_p = \frac{k_p}{k}, \overline{k}_i = \frac{k_i \omega_p}{k}, \overline{k}_d = \frac{k_d}{k \omega_p}.$$

It is to be appreciated that this example method can be employed with linear and/or non-linear PIDs.

Figure 6:
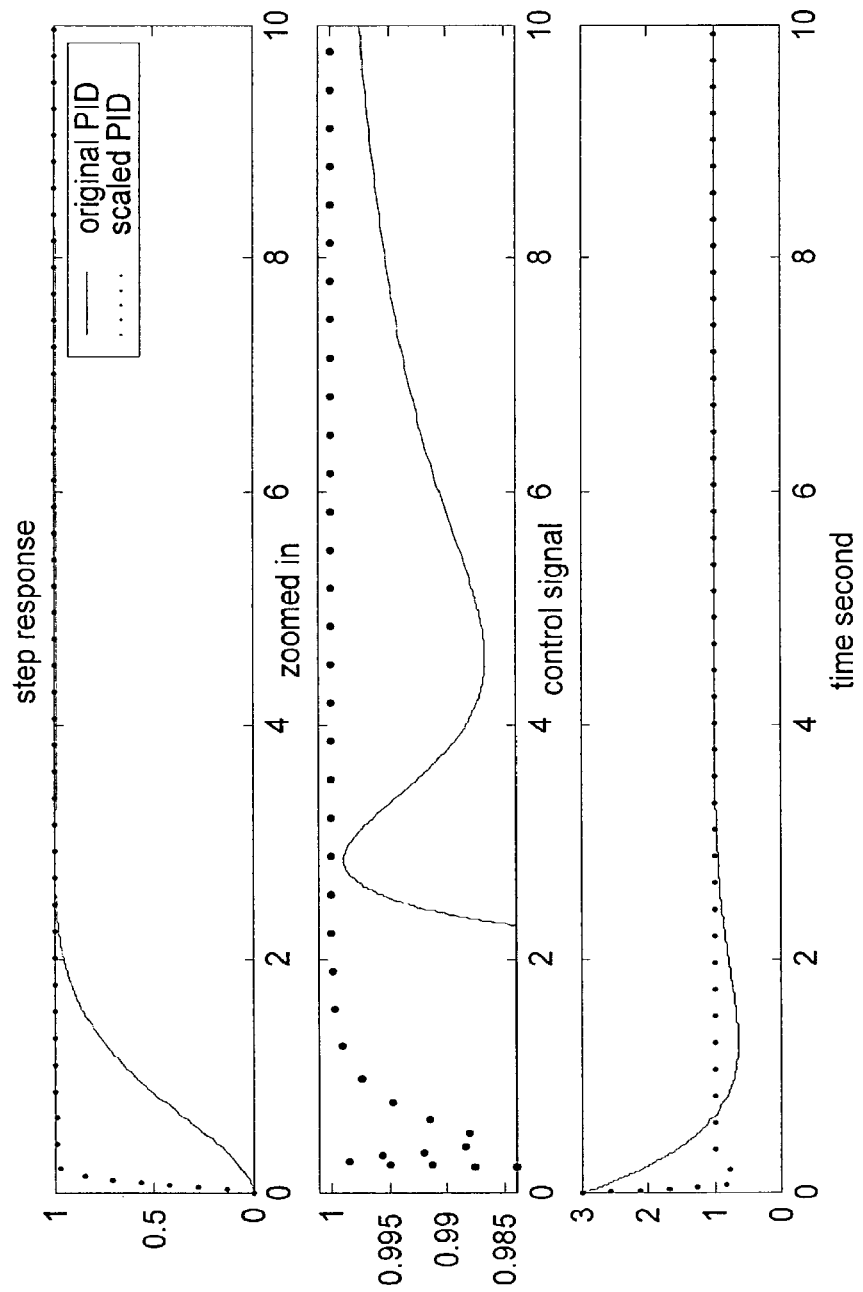
FIG. 6 compares controller responses.

Applying a unit step function as the set point, the responses of an original controller and a scaled controller are shown in FIG. 6, demonstrating that the response of the scaled controller is substantially the same as the response of the original controller, but scaled by $\tau=1/\omega_0$. The gain margins of both systems are substantially infinite and the phase margins are both approximately 82.372 degrees. The 0 dB crossover frequency for both systems are 2.3935 and 23.935 r/s, respectively. Thus, the PID scaled by the example method is demonstrably appropriate for the application.

While the method described above concerned linear PIDs, it is to be appreciated that the method can also be applied to scaling nonlinear PIDs. For example, PID performance can be improved by using nonlinear gains in place of the linear ones. For example, $$u = k_p g_p(e) + k_i \int g_i(e) dt + k_d g_d(e) \quad (31)$$

where $g_p(e)$, $g_i(e)$, and $g_d(e)$ are nonlinear functions. The non-linear PLDs can be denoted NPID. Nonlinearities are selected so that the proportional control is more sensitive to small errors, the integral control is limited to the small error region—which leads to significant reduction in the associate phase lag—and the differential control is limited to a large error region, which reduces its sensitivity to the poor signal to noise ratio when the response reaches steady state and the error is small.

The NPID retains the simplicity of PID and the intuitive tuning. The same gain scaling formula (30) will also apply to the NPID controller when the plant changes from $G_p(s)$ to $kG_p(s/\omega_p)$.

Scaling facilitates concentrating on normalized control problems like those defined in (22). This facilitates selecting an appropriate controller for an individual problem by using the scaling formula in (26) and the related systems and methods that produce tangible, results (e.g., scaled controller). This further facilitates focusing on the fundamentals of control, like basic assumptions, requirements, and limitations. Thus, the example systems, methods, and so on described herein concerning scaling and parameterization can be employed to facilitate optimizing individual solutions given the physical constraints of a problem.

Parameterization

Working with controllers can be simplified if they can be described in terms of a smaller set of parameters than is conventionally possible. Typically, a controller (and possibly an observer) may have many (e.g. 15) parameters. The systems and methods described herein concerning parameterization facilitate describing a controller in terms of a single parameter. In one example, controller parameterization concerns making controller parameters functions of a single variable, the controller bandwidth $\omega_n$.

Considering the normalized plants in (22) and assuming desired closed-loop transfer functions are:

$$\frac{\omega_c}{s+\omega_c}, \frac{\omega_c^2}{(s+\omega_c)^2}, \frac{\omega_c^3}{(s+\omega_c)^3}, \ldots \quad (32)$$

then for second order plants, the damping ratio can be set to unity, resulting in two repeatea poles at $-\omega_c$. The same technique can also be applied to higher order plants.

Applying pole-placement design to the first and second order plants in (22), a set of example $\omega_c$ parameterized controllers are obtained and shown in Table I. Information concerning the plants and the related controllers can be stored, for example, in a data store.

TABLE I

Examples of $\omega_c$-parameterized controllers

| $G_p(s)$ | $\frac{1}{s+1}$ | $\frac{1}{s}$ | $\frac{1}{s^2+2\xi s+1}$ | $\frac{1}{s(s+1)}$ | $\frac{1}{s^2}$ |
|---|---|---|---|---|---|
| $G_c(s, \omega_c)$ | $\frac{\omega_c(s+1)}{s}$ | $\omega_c$ | $\omega_c^2 \frac{s^2+2\xi s+1}{s(s+2\omega_c)}$ | $\frac{\omega_c^2(s+1)}{s+2\omega_c}$ | $\frac{\omega_c^2 s}{s+2\omega_c}$ |

Loop shaping design can also be parameterized. Loop-shaping refers to manipulating the loop gain frequency response, $L(j\omega)=G_p(j\omega)G_c(j\omega)$, as a control design tool. One example loop-shaping method includes converting design specifications to loop gain constraints, as shown in FIG. 7 and finding a controller $G_c(j\omega)$ to meet the specifications.

Figure 7:
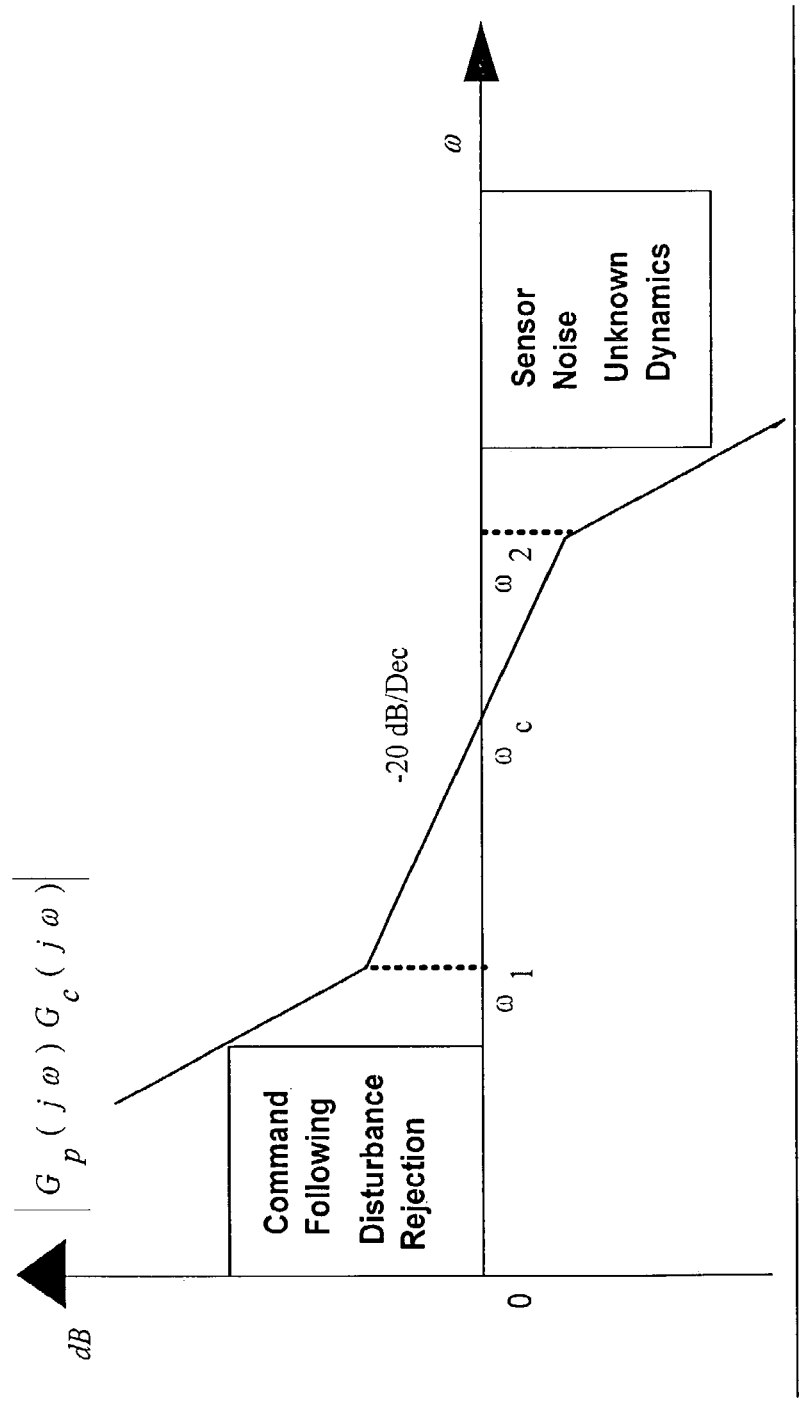
FIG. 7 illustrates loop shaping.

As an example of loop shaping, considering the plants of the form $G_p(s)$, in Table I, the desired loop gain can be characterized as $$L(s) = G_p(s)G_c(s) = \left(\frac{s+\omega_1}{s}\right)^m \frac{1}{\frac{s}{\omega_c}+1} \frac{1}{\left(\frac{s}{\omega_2}+1\right)^n} \quad (33)$$

where $\omega_c$ is the bandwidth, and $$\omega_1 < \omega_c, \omega_2 > \omega_c, m \geq 0, \text{ and } n \geq 0 \quad (34)$$

are selected to meet constrains shown in FIG. 7. In the example, both m and n are integers. In one example, default values for $\omega_1$ and $\omega_2$ are $$\omega_1 = \omega_c/10 \text{ and } \omega_2 = 10\omega_c \quad (35)$$

which yield a phase margin greater than forty-five degrees.

Once appropriate loop gain constraints are derived and the corresponding lowest order L(s) in (33) is selected, the controller can be determined from $$G_c(s) = \left(\frac{s+\omega_1}{s}\right)^m \frac{1}{\frac{s}{\omega_c}+1} \frac{1}{\left(\frac{s}{\omega_2}+1\right)^n} G_p^{-1}(s) \quad (36)$$

An additional constraint on n is that $$\frac{1}{\frac{s}{\omega_c}+1} \frac{1}{\left(\frac{s}{\omega_2}+1\right)^n} G_p^{-1}(s) \text{ is proper.} \quad (37)$$

This design is valid for plants with a minimum phase. For a non-minimum phase plant, a minimum phase approximation of $G_p^{-1}(s)$ can be employed.

A compromise between $\omega_1$ and the phase margin can be made by adjusting $\omega_1$ upwards, which will improve the low frequency properties at the cost of reducing phase margin. A similar compromise can be made between phase margin and $\omega_2$.

Figure 4:
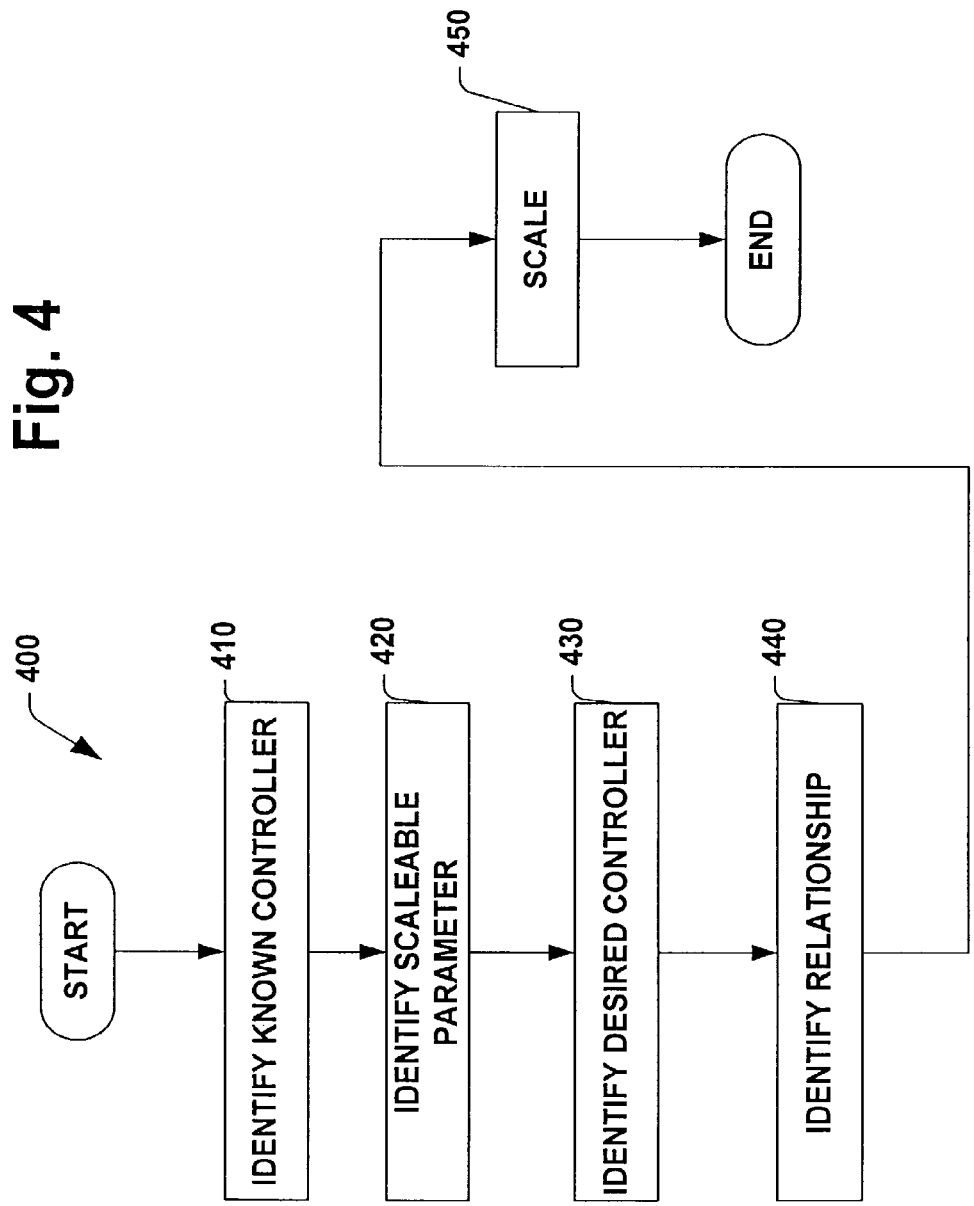
FIG. 4 illustrates an example controller scaling method.

Turning to FIG. 4, an example method 400 for scaling a controller is illustrated. The method 400 includes, at 410, identifying a known controller in a controller class where the known controller controls a first plant. The method 400 also includes, at 420, identifying a scaleable parameter for the known controller. At 430, the method 400 includes identifying a desired controller in the controller class, where the desired controller controls a second, frequency related plant and at 440, establishing the frequency relation between the known controller and the desired controller. At 450, the method 400 scales the known controller to the desired controller by scaling the scaleable parameter based, at least in part, on the relation between the known controller and the desired controller.

Practical Optimization Based on a Hybrid Scaling and Parameterization Method

Practical controller optimization concerns obtaining optimal performance out of existing hardware and software given physical constraints. Practical controller optimization is measured by performance measurements including, but not limited to, command following quickness (a.k.a. settling time), accuracy (transient and steady state errors), and disturbance rejection ability (e.g., attenuation magnitude and frequency range). Example physical constraints include, but are not limited to, sampling and loop update rate, sensor noise, plant dynamic uncertainties, saturation limit, and actuation signal smoothness requirements.

Conventional tuning relies, for example, on minimizing a cost function like $H_2$ and However, conventional cost functions may not comprehensively reflect the realities of control engineering, and may, therefore, lead to suboptimal tuning. For example, one common cost function is mathematically attractive but can lead to suboptimal controller tuning. Thus, optimizing other criteria, like $\omega_c$ are considered.

A typical industrial control application involves a stable single-input single-output (SISO) plant, where the output represents a measurable process variable to be regulated and the input represents the control actuation that has a certain dynamic relationship to the output. This relationship is usually nonlinear and unknown, although a linear approximation can be obtained at an operating point via the plant response to a particular input excitation, like a step change.

Evaluating performance measurements in light of physical limitations yields the fact that they benefit from maximum controller bandwidth $\omega_c$. If poles are placed in the same location, then $\omega_c$ can become the single item to tune. Thus, practical PID optimization can be achieved with single parameter tuning. For example, in manufacturing, a design objective for an assembly line may be to make it run as fast as possible while minimizing the down time for maintenance and trouble shooting. Similarly, in servo design for a computer hard disk drive, a design objective may be to make the read/write head position follow the setpoint as fast as possible while maintaining extremely high accuracy. In automobile anti-lock brake control design, a design objective may be to have the wheel speed follow a desired speed as closely as possible to achieve minimum braking distance.

In the three examples, the design goal can be translated to maximizing controller bandwidth $\omega_c$. There are other industrial control examples that lead to the same conclusion. Thus, $\omega_c$ maximization appears to be a useful criterion for practical optimality. Furthermore, unlike purely mathematical optimization techniques, $\omega_c$ optimization has real world applicability because it is limited by physical constraints. For example, sending $\omega_c$ to infinity may be impractical because it may cause a resulting signal to vary unacceptably.

As an example of how physical limitations may affect $\omega_c$ optimization, consider digital control apparatus that have a maximum sampling rate and a maximum loop update rate. The maximum sampling rate is a hardware limit associated with the Analog to Digital Converter (ADC) and the maximum loop update rate is software limit related to central processing unit (CPU) speed and the control algorithm complexity. Typically, computation speeds outpace sampling rates and therefore only the sampling rate limitation is considered.

As another example, measurement noise may also be considered when examining the physical limitations of $\omega_c$ optimization. For example, the $\omega_c$ is limited to the frequency range where the accurate measurement of the process variable can be obtained. Outside of this range, the noise can be filtered using either analog or digital filters.

Plant dynamic uncertainty may also be considered when examining the physical limitations of $\omega_c$ optimization. Conventional control design is based on a mathematical description of the plant, which may only be reliable in a low frequency range. Some physical plants exhibit erratic phase distortions and nonlinear behaviors at a relative high frequency range. The controller bandwidth is therefore limited to the low frequency range where the plant is well behaved and predictable. To safeguard the system from instability, the loop gain is reduced where the plant is uncertain. Thus, maximizing the bandwidth safely amounts to expanding the effective (high gain) control to the edge of frequency range where the behavior of the plant is well known.

Similarly, actuator saturation and smoothness may also affect design. Although using transient profile helps to decouple bandwidth design and the transient requirement, limitations in the actuator like saturation, nonlinearities like backlash and hysteresis, limits on rate of change, smoothness requirements based on wear and tear considerations, and so on may affect the design. For example, in a motion control application with a significant backlash problem in the gearbox, excessively high bandwidth will result in a chattering gearbox and, very likely, premature breakdown. Thus, $\omega_c$ optimization, because it considers physical limitations like sampling rate, loop update rate, plant uncertainty, actuator saturation, and so on, may produce improved performance.

Figure 8:
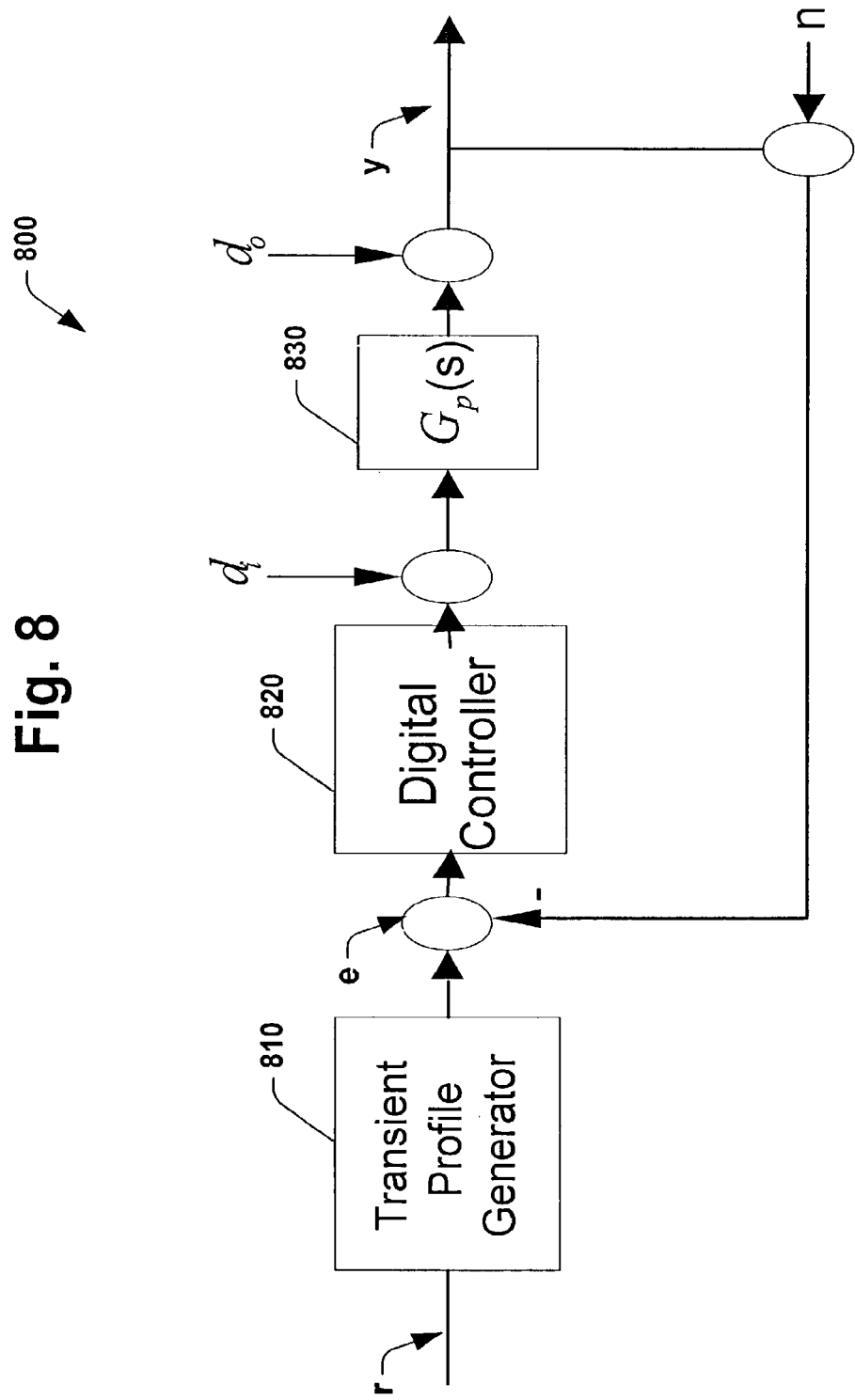
FIG. 8 illustrates a closed loop simulator setup.

In one controller optimization example, assume that the plant is minimum phase, (e.g., its poles and zeros are in the left half plane), that the plant transfer function is given, that the $\omega_c$ parameterized controllers are known and available in form of Table I, that a transient profile is defined according to the transient response specifications, and that a simulator 800 of closed-loop control system as shown in FIG. 8 is available. It is to be appreciated that the closed loop control system simulator 800 can be, for example, hardware, software or a combination of both. In one example, the simulator incorporates limiting factors including, but not limited to, sensor and quantization noises, sampling disturbances, actuator limits, and the like.

With these assumptions, one example design method then includes, determining frequency and gain scales, w, and k from the given plant transfer function. The method also includes, based on the design specification, determining the type of controller required from, for example, Table I. The method also includes selecting the $G_c(s, \omega_c)$ corresponding to the scaled plant in the form of Table I. The method also includes scaling the controller to $$\frac{1}{k} G_c\left(\frac{s}{\omega_p}, \omega_c\right),$$

digitizing $G_c(s/\omega_p, \omega_c)/k$ and implementing the controller in the simulator. The method may also include setting an initial value of $\omega_c$ based on the bandwidth requirement from the transient response and increasing $\omega_c$ while performing tests on the simulator, until either one of the following is observed:

a. Control signal becomes too noisy and/or too uneven, or
b. Indication of instability (oscillatory behavior)

Consider an example motion control test bed for which the mathematical model of the motion system is $$\ddot{y}=(-1.41\dot{y}+23.27T_d)+23.2u \quad (38)$$

where y is the output position, u is the control voltage sent to the power amplifier that drives the motor, and $T_d$ is the torque disturbance. An example design objective for the example system could be rotating the load one revolution in one second with no overshoot. Thus, the physical characteristics of the example control problem are:

1) |u|<3.5 volt,
2) sampling rate=1 kHz,
3) sensor noise is 0.1% white noise,
4) torque disturbance up to 10% of the maximum torque,
5) smooth control signal.

The plant transfer function is $$G_p(s) = \frac{k}{\frac{s}{\omega_p}\left(\frac{s}{\omega_p}+1\right)}, k = 11.67 \text{ and } \omega_p = 1.41.$$

Now consider the corresponding UGUB plant $$\overline{G}_p(s) = \frac{1}{s(s+1)}.$$

A PD design of $$u=k_p(r-y)+k_d(-\dot{y})$$

with $$k_p=\omega_c^2 \text{ and } k_d=2\omega_c-1$$

makes the closed-loop transfer function $$G_{cl}(s) = \frac{\omega_c^2}{(s+\omega_c)^2}.$$

Considering the plant gain scale of k and the frequency scale of $\omega_p$, the PD gains are then scaled as $$k_p = \frac{\omega_c^2}{k} = .086\omega_c^2 \text{ and } k_d = \frac{2\omega_c-1}{k\omega_p} = .061(2\omega_c-1).$$

Figure 9:
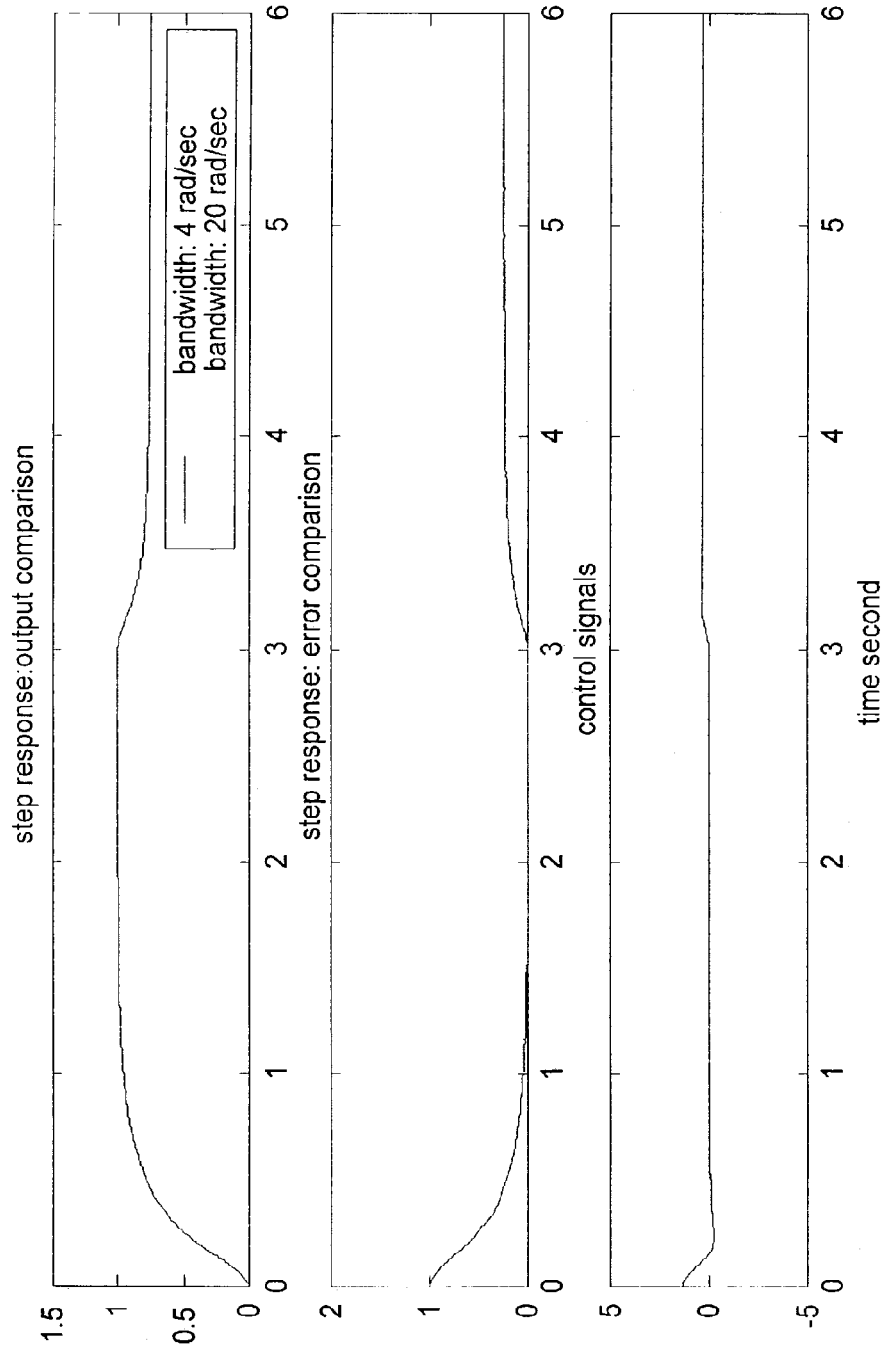
FIG. 9 compares step responses.
Figure 10:
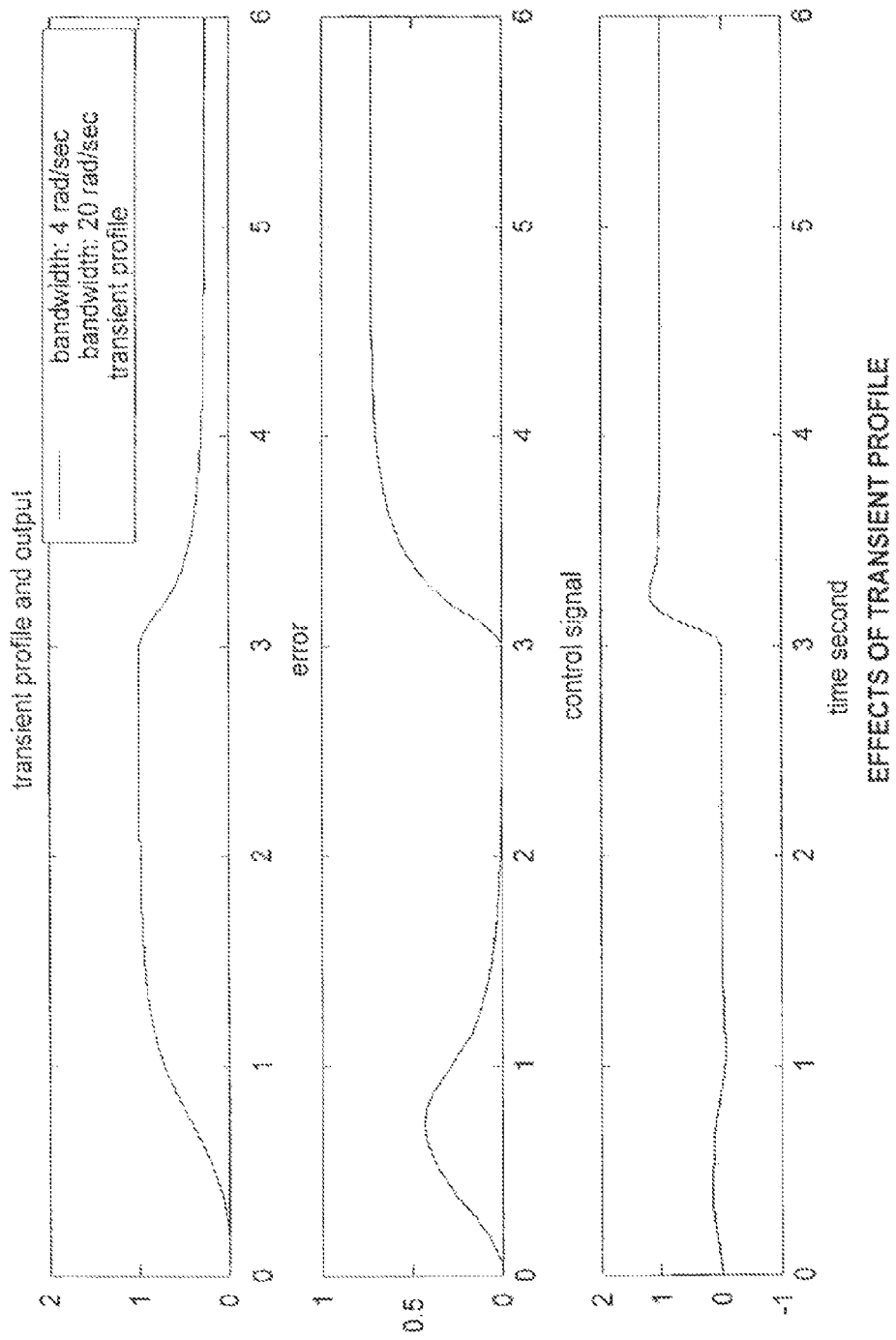
FIG. 10 illustrates transient profile effects.
Figure 11:
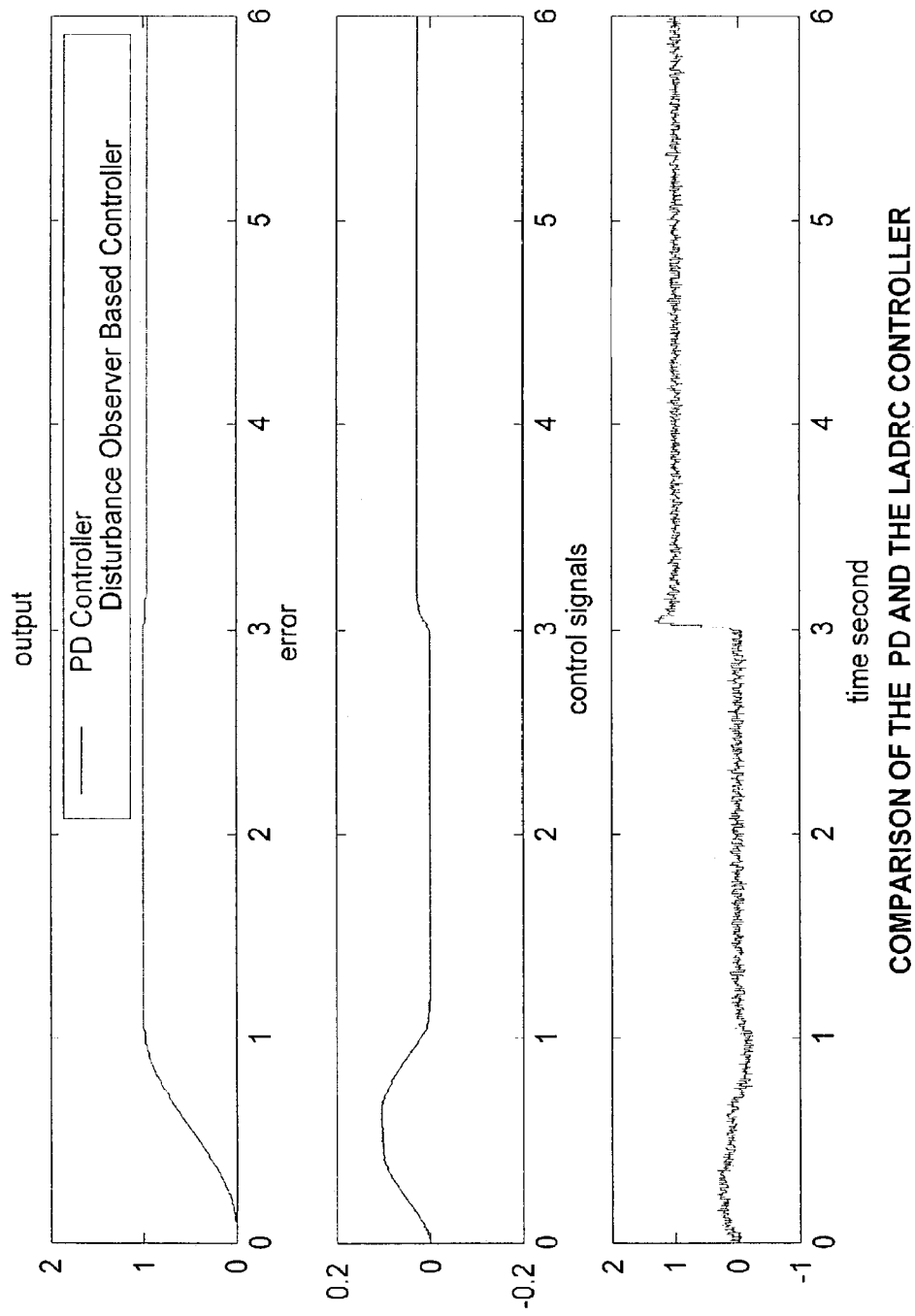
FIG. 11 compares PD and LADRC controllers.

To avoid noise corruptions of the control signal, an approximate differentiator $$\frac{s}{\left(\frac{s}{10\omega_c}+1\right)^2}$$

is used where the corner frequency $10\omega_c$ is selected so that the differentiator approximation does not introduce problematic phase delays at the crossover frequency. Using a conventional root locus method, the one second settling time would require a closed-loop bandwidth of 4 rad/sec. The example single parameter design and tuning methods described herein facilitate determining that an $\omega_c$ of 20 rad/sec yields optimal performance under the given conditions. A comparison of the two designs is shown in FIG. 9. Note that a step disturbance of 1 volt is added at t=3 seconds to test disturbance rejection. Finally, a trapezoidal transient profile is used in place of the step command. The results are shown in FIG. 10.

Parameterization of State Feedback and State Observer Gains

As described in the Background section, the State Feedback (SF) controller $$u = r + K\hat{x} \quad (4)$$

is based on the state space model of the plant:

$$\dot{x}(t) = Ax(t) + Bu(t), y(t) = Cx(t) + Du(t) \quad (5)$$

When the state x is not accessible, a state observer (SO):

$$\dot{\hat{x}} = A\hat{x} + Bu + L(y - \hat{y}) \quad (6)$$

is often used to find its estimate, $\hat{x}$. Here r is the setpoint for the output to follow. The state feedback gain K and the observer gain L are determined from the equations:

$$\text{eig}(A+BK) = \lambda_c(s) \text{ and eig}(A+LC) = \lambda_o(s)$$

where $\lambda_c(s)$ and $\lambda_o(s)$ are polynomials of s that are chosen by the designer. Usually the K and L have many parameters and are hard to tune.

The parameterization of state feedback and state observer gains are achieved by making $$\lambda_c(s) = (s+\omega_c)^n \text{ and } \lambda_o(s) = (s+\omega_o)^n$$

where $\omega_c$ and $\omega_o$ are bandwidth of the state feedback system and the state observer, respectively, and n is the order of the system. This simplifies tuning since parameters in K and L are now functions of $\omega_c$ and $\omega_o$, respectively.

Parameterization of Linear Active Disturbance Rejection Controller (LADRC) for a Second Order Plant Some controllers are associated with observers. Conventionally, second order systems with controllers and observers may have a large number (e.g., 15) tunable features in each of the controller and observer. Thus, while a design method like the Hann method is conceptually viable, its practical implementation is difficult because of tuning issues. As a consequence of the scaling and parameterization described herein, observer based systems can be constructed and tuned using two parameters, observer bandwidth ($\omega_0$) and controller bandwidth ($\omega_c$).

State observers provide information on the internal states of plants. State observers also function as noise filters. A state observer design principle concerns how fast the observer should track the states, (e.g., what should its bandwidth be). The closed-loop observer, or the correction term $L(y-\hat{y})$ in particular, accommodates unknown initial states, uncertainties in parameters, and disturbances. Whether an observer can meet the control requirements is largely dependent on how fast the observer can track the states and, in case of ESO, the disturbance $f(t,x_1,x_2,w)$. Generally speaking, faster observers are preferred. Common limiting factors in observer design include, but are not limited to dependency on the state space model of the plant, sensor noise, and fixed sampling rate.

Dependency on the state space model can limit an application to situations where a model is available. It also makes the observer sensitive to the inaccuracies of the model and the plant dynamic changes. The sensor noise level is hardware dependent, but it is reasonable to assume it is a white noise with the peak value 0.1% to 1% of the output. The observer bandwidth can be selected so that there is no significant oscillation in its states due to noises. A state observer is a closed-loop system by itself and the sampling rate has similar effects on the state observer performance as it does on feedback control. Thus, an example model independent state observer system is described.

Figure 18:
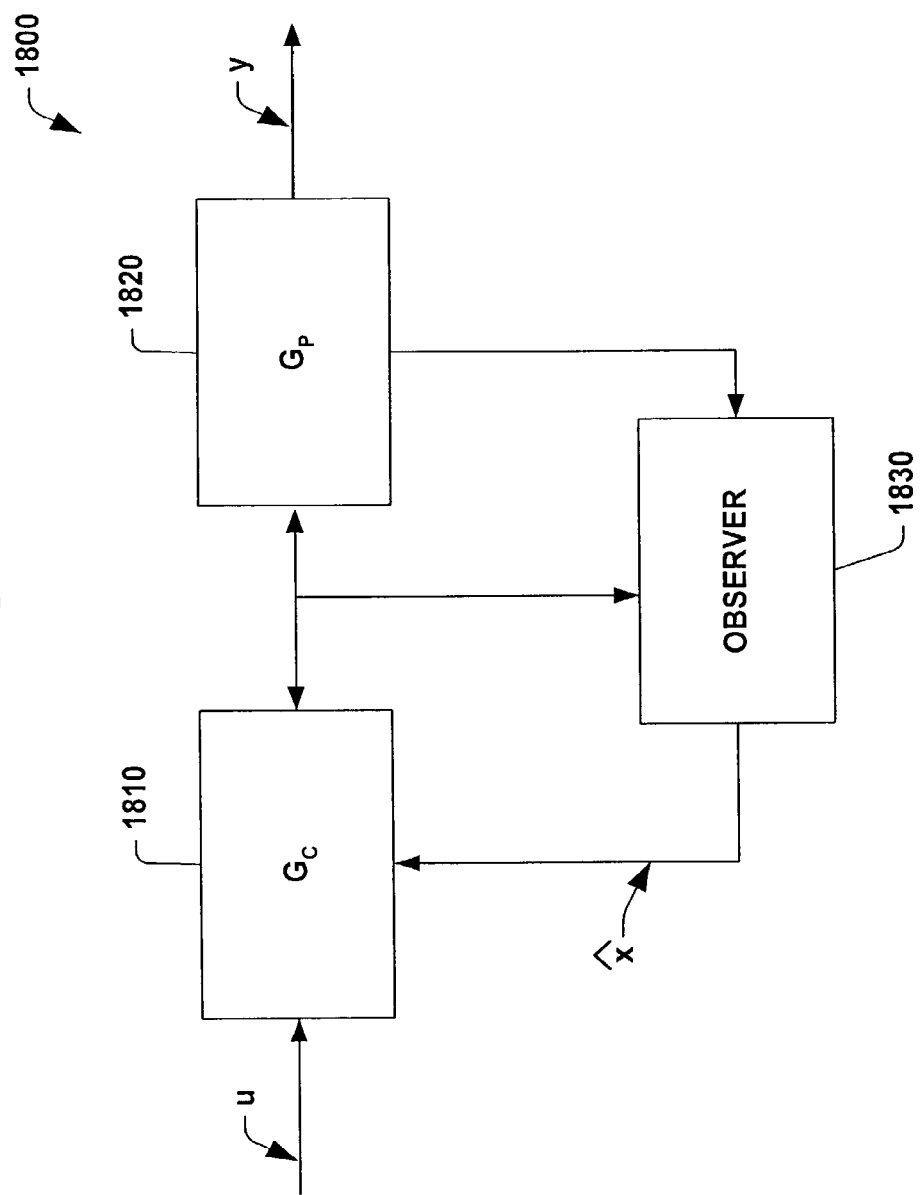
FIG. 18 illustrates an example observer based system.

Observers are typically based on mathematical models. Example systems and methods described herein can employ a "model independent" observer as illustrated in FIG. 18. For example a plant 1820 may have a controller 1810 and an observer 1830. The controller 1810 may be implemented as a computer component and thus may be programmatically tunable. Similarly, the observer 1830 may be implemented as a computer, component and thus may have scaleable parameters that can be scaled programmatically. Furthermore, using analogous scaling and parameterizing as described herein, the parameters of the observer 1830 can be reduced to $\omega_o$. Therefore, overall optimizing of the system 1800 reduces to tuning $\omega_c$ and $\omega_o$.

Consider a simple example for controlling a second order plant $$\ddot{y} = -a\dot{y} - by + w + bu \quad (39)$$

where y and u are output and input, respectively, and w is an input disturbance. Here both parameters, a and b, are unknown, although there is some knowledge of b, (e.g., $b_0 \approx b$, derived from the initial acceleration of y in step response). Rewrite (39) as $$\ddot{y} = -a\dot{y} - by + w + (b-b_0)u + b_0u = f + b_0u \quad (40)$$

where $f = -a\dot{y} - by + w + (b-b_0)u$. Here $f$ is referred to as the generalized disturbance, or disturbance, because it represents both the unknown internal dynamics, $-a\dot{y} - by + (b-b_0)u$ and the external disturbance w(t).

If an estimate of $f$; $\hat{f}$ can be obtained, then the control law $$u = \frac{-\hat{f} + u_0}{b_0}$$

reduces the plant to $\ddot{y} = (f - \hat{f}) + u_0$ which is a unit-gain double integrator control problem with a disturbance $(f - \hat{f})$.

Thus, rewrite the plant in (40) in state space form as $$\begin{cases} \dot{x}_1 = x_2 \\ \dot{x}_2 = x_3 + b_0 u \\ \dot{x}_3 = h \\ y = x_1 \end{cases} \quad (41)$$

with $x_3 = f$ added as an augmented state, and $h = \dot{f}$ is seen as an unknown disturbance. Now $f$ can be estimated using a state observer based on the state space model $$\dot{x} = Ax + Bu + Eh$$

$$y = Cz \quad (42)$$

$$A = \begin{bmatrix} 0 & 1 & 0 \\ 0 & 0 & 1 \\ 0 & 0 & 0 \end{bmatrix}, B = \begin{bmatrix} 0 \\ b_0 \\ 0 \end{bmatrix}, C = [1 \ 0 \ 0], E = \begin{bmatrix} 0 \\ 0 \\ 1 \end{bmatrix}$$

Now the state space observer, denoted as the linear extended state observer (LESO), of (42) can be constructed as $$\dot{z} = Az + Bu + L(y - \hat{y}) \tag{43}$$

$$\hat{y} = Cz$$

which can be reconstructed in software, for example, and L is the observer gain vector, which can be obtained using various methods known in the art like pole placement, $$L = [\beta_1 \beta_2 \beta_3]^T \tag{44}$$

where $[\ ]^T$ denotes transpose. With the given state observer, the control law can be given as:

$$u = \frac{-z_3 + u_0}{b_0} \tag{45}$$

Ignoring the inaccuracy of the observer, $$\ddot{y} = (f - z_3) + u_0 \approx u_0 \tag{46}$$

which is an unit gain double integrator that can be implemented with a PD controller $$u_0 = k_p(r - z_1) - k_d z_2 \tag{47}$$

where r is the setpoint. This results in a pure second order closed-loop transfer function of $$G_{cl} = \frac{1}{s^2 + k_d s + k_p} \tag{48}$$

Thus, the gains can be selected as $$k_d = 2\xi\omega_c \text{ and } k_p = \omega_c^2 \tag{49}$$

where $\omega_c$ and $\zeta$ are the desired closed loop natural frequency and damping ratio. $\zeta$ can be chosen to avoid oscillations. Note that $-k_d z_2$, instead of $k_d(\dot{r} - z_2)$, is used to avoid differentiating the setpoint and to make the closed-loop transfer function a pure second order one without a zero.

This example illustrates that disturbance observer based PD control achieves zero steady state error without using the integral part of a PID controller. The example also illustrates that the design is model independent in that the design relies on the approximate value of b in (39). The example also illustrates that the combined effects of the unknown disturbance and the internal dynamics are treated as a generalized disturbance. By augmenting the observer to include an extra state, it is actively estimated and canceled out, thereby achieving active disturbance rejection. This LESO based control scheme is referred to as linear active disturbance rejection control (LADRC) because the disturbance, both internal and external, represented by $f$, is actively estimated and eliminated.

The stability of controllers can also be examined. Let $e_i = x_i - z_i$, i=1, 2, 3. Combine equation (43) and (44) and subtract the combination from (42). Thus, the error equation can be written:

$$\dot{e} = A_e e + Eh \tag{50}$$

where $$A_e = A - LC = \begin{bmatrix} -\beta_1 & 1 & 0 \\ -\beta_2 & 0 & 1 \\ -\beta_3 & 0 & 0 \end{bmatrix}$$

and E is defined in (42). The LESO is bounded input, bounded output (BIBO) stable if the roots of the characteristic polynomial of $A_e$ $$\lambda(s) = s^3 + \beta_1 s^2 + \beta_2 s + \beta_3 \tag{51}$$

are in the left half plane (LHP) and h is bounded. This separation principle also applies to LADRC.

The LADRC design from (43) to (46) yields a BIBO stable closed-loop system if the observer in (43) and (44) and the feedback control law (46) for the double integrator are stable, respectively. This is shown by combing equations (45) and (47) into a state feedback form of $u = (1/b_0)[-k_p - k_d - 1]z = Fz$, where $F = (1/b_0)[-k_p - k_d - 1]$. Thus, the closed-loop system can be represented by the state-space equation of $$\begin{bmatrix} \dot{x} \\ \dot{z} \end{bmatrix} = \begin{bmatrix} A & \bar{B}F \\ LC & A - LC + \bar{B}F \end{bmatrix} \begin{bmatrix} x \\ z \end{bmatrix} + \begin{bmatrix} [\bar{B} \ E] \\ [\bar{B} \ 0] \end{bmatrix} \begin{bmatrix} r \\ h \end{bmatrix} \tag{52}$$

where $\bar{B} = B/b_0$, and which is BIBO stable if its eigenvalues are in the LHP. By applying row and column operations, the closed-loop eigenvalues $$eig\left( \begin{bmatrix} A & \bar{B}F \\ LC & A - LC + \bar{B}F \end{bmatrix} \right) = eig\left( \begin{bmatrix} A + \bar{B}F & \bar{B}F \\ 0 & A - LC \end{bmatrix} \right)$$

$$= eig(A = BF) \cup eig(A - LC)$$

$$= \{\text{roots of } s^2 + k_d s + k_p\} \cup$$

$$\{\text{roots of } s^3 + \beta_1 s^2 + \beta_2 s + \beta_3\}$$

Since r is the bounded reference signal, a nontrivial condition on the plant is that $h = \dot{f}$ is bounded. In other words, the disturbance $f$ must be differentiable.

Observer Bandwidth Parameterization $\omega_o$ parameterization refers to parameterizing the ESO on observer bandwidth $\omega_o$. Consider a plant (42) that has three poles at the origin. The related observer will be less sensitive to noises if the observer gains in (44) are small for a given $\omega_o$. But observer gains are proportional to the distance for the plant poles to those of the observer. Thus the three observer poles should be placed at $-\omega_o$, or equivalently, $$\lambda(s) = s^3 + \beta_1 s^2 + \beta_2 s + \beta_3 = (s + \omega_o)^3 \tag{53}$$

That is $$\beta_1 = 3\omega_o, \beta_2 = 3\omega_o^2, \beta_3 = \omega_o^3 \tag{54}$$

It is to be appreciated by one of ordinary skill in the art that equations (53) and (54) are extendable to nth order ESO. Similarly, the parameterization method can be extended to the Luenberger Observer for arbitrary A, B, and C matrices, by obtaining $\{\bar{A}, \bar{B}, \bar{C}\}$ as observable canonical form of $\{A, B, C\}$, determining the observer gain, $\bar{L}$, so that the poles of the observer are at $-\omega_o$ and using the inverse state transformation to obtain the observer gain, L, for $\{A, B, C\}$. The parameters in L are functions of $\omega_o$. One example procedure for $\omega_o$ optimization based design is now described.

Given tolerable noise thresholds in the observer states, increase $\omega_o$ until at least one of the thresholds is about to be reached or the observer states become oscillatory due to sampling delay. In general, the faster the ESO, the faster the disturbance is observed and cancelled by the control law.

A relationship between $\omega_o$ and $\omega_c$ can be examined. One example relationship is $$\omega_o \approx 3\text{--}5\omega_c \tag{55}$$

Equation (55) applies to a state feedback control system where $\omega_o$ is determined based on transient response requirements like the settling time specification. Using a transient profile instead of a step command facilitates more aggressive control design. In this example there are two bandwidths to consider, the actual control loop bandwidth $\omega_c$ and the equivalent bandwidth of the transient profile, $\bar{\omega}_c$. Part of the design procedure concerns selecting which of the two to use in (55). Since the observer is evaluated on how closely it tracks the states and $\bar{\omega}_c$ is more indicative than $\omega_c$ on how fast the plant states move, $\bar{\omega}_c$ is the better choice, although it is to be appreciated that either can be employed. Furthermore, taking other design issues like the sampling delay into consideration, a more appropriate minimum $\omega_o$ is found through simulation and experimentation as $$\omega_o \approx 5\text{--}10\omega_c \tag{56}$$

An example for optimizing LADRC is now presented. One example LADRC design and optimization method includes designing a parameterized LESO and feedback control law where $\omega_o$ and $\omega_c$ are the design parameters. The method also includes designing a transient profile with the equivalent bandwidth of $\bar{\omega}_c$ and selecting an $\omega_o$ from (56). The method then includes setting $\omega_c = \omega_o$ and simulating and/or testing the LADRC in a simulator. The method also includes incrementally increasing $\omega_c$ and $\omega_o$ by the same amount until the noise levels and/or oscillations in the control signal and output exceed the tolerance. The method also includes incrementally increasing or decreasing $\omega_c$ and $\omega_c$ individually, if necessary, to make trade-offs between different design considerations like the maximum error during the transient period, the disturbance attenuation, and the magnitude and smoothness of the controller.

In one example, the simulation and/or testing may not yield satisfactory results if the transient design specification described by $\bar{\omega}_c$ is untenable due to noise and/or sampling limitations. In this case, control goals can be lowered by reducing $\bar{\omega}_c$ and therefore $\omega_c$ and $\omega_o$. It will be appreciated by one skilled in the art that this approach can be extended to Luenbergtate observer based state feedback design.

By way of illustration, reconsider the control problem example associated with equations (32), but apply the LADRC in (43) to (48). Note that b=23.2 for this problem, but to make the design realistic, assume the designer's estimate of b is $b_0$=40. Now rewrite the plant differential equation (38) as $$\ddot{y}(-1.41\dot{y}+23.2T)+(23.2-40)u+40u=f+40u$$

The LESO is $$\dot{z} = \begin{bmatrix} -3\omega_o & 1 & 0 \\ -3\omega_o^2 & 0 & 1 \\ -\omega_o^3 & 0 & 0 \end{bmatrix} z + \begin{bmatrix} 0 & 3\omega_o \\ 40 & 3\omega_o^2 \\ 0 & \omega_o^3 \end{bmatrix} \begin{bmatrix} u \\ y \end{bmatrix}$$

and $$z_1 \to y, z_2 \to \dot{y}, \text{ and}$$

$$z_1 \to f = -1.41\dot{y}+23.2T_d+(23.2-40)u, \text{ as } t \to \infty$$

Figure 12:
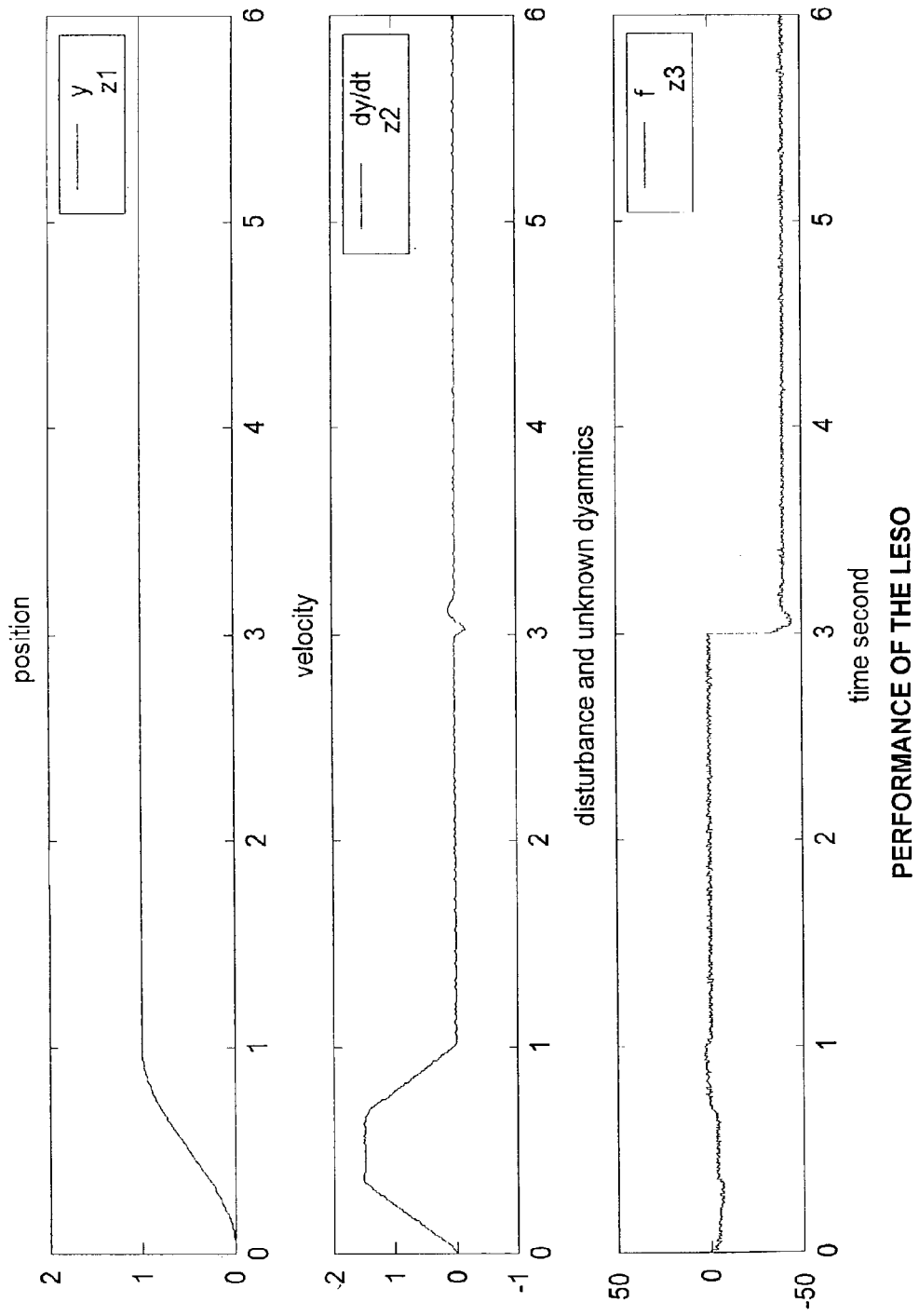
FIG. 12 illustrates LESO performance.

The control law is defined as $$u = \frac{u_0 - z_3}{40} \text{ and } u_0 = k_p(r - z_1) - k_d z_2$$

with $$k_d = 2\xi\omega_c, \xi = 1, \text{ and } k_p = \omega_c^2$$

where $\omega_c$ is the sole design parameter to be tuned. A trapezoidal transient profile is used with a settling time of one second, or $\bar{\omega}_c$=4. From (56), $\omega_o$ is selected to be 40 rad/sec. The LADRC facilitates design where a detailed mathematical model is not required, where zero steady state error is achieved without using the integrator term in PID, where there is better command following during the transient stage and where the controller is robust. This performance is achieved by using a disturbance observer. Example performance is illustrated in FIG. 12.

Parameterization of LADRC for Nth Order Plant

It will be appreciated by one skilled in the art that observer based design and tuning techniques can be scaled to plants of arbitrary orders. For a general nth order plant with unknown dynamics and external disturbances, $$y^{(n)} = f(t,y,\dot{y},\ldots,y^{(n-1)},u,\dot{u},\ldots u^{(n-1)},w) + bu \tag{57}$$

the observer can be similarly derived, starting from the state space equation $$\begin{cases} \dot{x}_1 = x_2 \\ \dot{x}_2 = x_3 \\ \ldots \\ \dot{x}_n = x_{n+1} + b_0 u \\ \dot{x}_{n+1} = h \\ y = x_1 \end{cases} \tag{58}$$

with $x_{n+1} = f$ added as an augmented state, and $h = \dot{f}$ mostly unknown. The observer of (43) in its linear form with the observer gain $$L = [\beta_1, \beta_2 \ldots \beta_{n+1}] \tag{59}$$

has the form $$\begin{cases} \dot{z}_1 = x_2 - \beta_1(z_1 - y(t)) \\ \dot{z}_2 = z_3 - \beta_2(z_1 - y(t)) \\ \ldots \\ \dot{z}_n = z_{n+1} - \beta_n(z_1 - y(t)) + b_0 u \\ \dot{z}_{n+1} = -\beta_{n+1}(z_1 - y(t)) \end{cases} \tag{60}$$

With the gains properly selected, the observer will track the states and yield $$z_1(t) \to y(t), z_2(t) \to \dot{y}(t), \ldots, z_n(t) \to y^{(n-1)}(t)$$

$$z_{n+1}(t) \to f(t,y,\dot{y},\ldots,y^{(n-1)},u,\dot{u},\ldots u^{(n-1)},w) \tag{61}$$

The control law can also be similarly designed as in (45) and (47), with $$u = -\frac{z_{n+1} + u_0}{b_0} \quad (62)$$

which reduces the plant to approximately a unit gain cascaded integrator plant $$y^{(n)} = (f - z_{n+1}) + u_0 \approx u_0 \quad (63)$$

and $$u_0 = k_p(r - z_1) - k_{d_1} z_2 - \ldots - k_{d_n} z_n \quad (64)$$

where the gains are selected so that the closed-loop characteristic polynomial has n poles at $-\omega_c$, $$s^n + k_{d_{n-1}} s^{n-1} + \ldots + k_{d_1} s + k_p = (s + \omega_c)^n \quad (65)$$

$\omega_c$ is the closed-loop bandwidth to be optimized in tuning. The $\omega_o$ optimization can similarly be applied using $$s^n + \beta_1 s^{n-1} + \ldots + \beta_{n-1} s + \beta_n = (s + \omega_o)^n \quad (66)$$

The following example method can be employed to identify a plant order and $b_0$. Given a "black box" plant with input u and output y, the order, n, and $b_0$ can be estimated by allowing the plant to discharge energy stored internally so that it has a zero initial condition, (e.g., $y(0) = \dot{y}(0) = \ldots y^{(n-1)}(0) = 0$) and then assuming $f(0) = 0$. The method includes applying a set of input signals and determining the initial slope of the response: $\dot{y}(0^+)$, $\ddot{y}(0^+)$, . . . . The method also includes determining the slope $y^{(i)}(0^+)$ that is proportional to u(0) under various tests, (e.g., $y^{(i)}(0^+) = ku(0)$). Then the method includes setting n=i+1 and $b_0$=k.

Auto-Tuning Based on the New Scaling, Parameterization and Optimization Techniques Auto-tuning concerns a "press button function" in digital control equipment that automatically selects control parameters. Auto-tuning is conventionally realized using an algorithm to calculate the PID parameters based on the step response characteristics like overshoot and settling time. Auto-tuning has application in, for example, the start up procedure of closed-loop control (e.g., commissioning an assembly line in a factory). Auto-tuning can benefit from scaling and parameterization.

In some applications, dynamic changes in the plant during operations are so severe that controller parameters are varied from one operating point to another. Conventionally, gain-scheduling is employed to handle these situations. In gain-scheduling, the controller gains are predetermined for different operating points and switched during operations. Additionally, and/or alternatively, self-tuning that actively adjusts control parameters based on real time data identifying dynamic plant changes is employed.

Common goals of these techniques are to make the controller parameter determination automatic, given the plant response to a certain input excitation, say a step function and to maintain a consistent controller performance over a wide range of operations, (e.g. making the controller robust).

Example systems, methods and so on described herein concerning scaling and parameterization facilitate auto-scaling model based controllers. When a transfer function model of a plant is available, the controller can be designed using either pole placement or loop shaping techniques. Thus, example scaling techniques described herein facilitate automating controller design and tuning for problems including, but not limited to, motion control, where plants are similar, differing only in dc gain and the bandwidth, and adjusting controller parameters to maintain high control performance as the bandwidth and the gain of the plant change during the operation.

In the examples, the plant transfer functions can be represented as $\overline{G}_p(s) = k G_p(s/\omega_p)$, where $G_p(s)$ is given and known as the "mother" plant and k and $\omega_p$ are obtained from the plant response or transfer function. Assuming the design criteria are similar in nature, differing only in terms of the loop gain bandwidth, $\omega_c$, the controller for similar plants can be automatically obtained by scaling the given controller, $G_c(s, \omega_c)$, for $G_p(s)$. This is achieved by combining the controller scaling, defined in equation (26), and $\omega_c$-parameterization to obtain the controller for $\overline{G}_p(s) = k G_p(s/\omega_p)$ as $$\overline{G}(s, \omega_c) = G_c(s/\omega_p, \omega_c)/k \quad (67)$$

There are three parameters in (67) that are subject to tuning. The first two parameters, k and $\omega_p$, represent plant changes or variations that are determined. The third parameter, $\omega_c$, is tuned to maximize performance of the control system subject to practical constraints.

An example method for auto-tuning is now described. The auto-tuning method includes examining a plant $G_p(s)$ and the nominal controller $G_c(s, \omega_c)$. Given the plant $G_p(s)$ and the nominal controller $G_c(s, \omega_c)$, the method includes performing off-line tests to determine k and $\omega_p$ for the plant. The method also includes using equation (67) to determine a new controller for the plant, $\overline{G}_p(s) = k G_p(s/\omega_p)$, obtained in the previous act. The method also includes optimizing $\omega_c$ for the new plant.

An example method for adaptive self-tuning is now described. The adaptive self-tuning procedure includes examining a plant $\overline{G}(s) = k G_p(s/\omega_p)$, where k and $\omega_p$ are subject to change during plant operation. Given the plant $\overline{G} = k G_p(s/\omega_p)$, the method includes performing real time parameter estimation to determine k and $\omega_p$ as they change. The method also includes determining when the performance of the control system is degraded beyond a pre-determined, configurable threshold and updating the controller using (67). The method also includes selectively decreasing $\omega_c$ if the plant dynamics deviate significantly from the model $k G_p(s/\omega_p)$, which causes performance and stability problems. The method also includes selectively increasing $\omega_c$ subject to $\omega_c$-optimization constraints if the plant model can be updated to reflect the changes of the plant beyond k and $\omega_p$.

The LADRC technique does not require the mathematical model of the plant. Instead, it employs a rough estimate of the single parameter b in the differential equation of the plant (57). This estimation is denoted as $b_0$ and is the sole plant parameter in LADRC. As the dynamics of the plant changes, so does b. Thus, $b_0$ can be estimated by rewriting (57) as $$y^{(n)} = f(t) + bu \quad (69)$$

and assuming the zero initial condition, (e.g., $y^{(i)}(0) = 0$, $i = 1, 2, \ldots n-1$ and $f(0) = 0$). Then $b_0 \approx b$ can be estimated by using $$b_0 = y^{(n)}(0^+)/u(0) \quad (70)$$

where u(0) is the initial value of the input. It is to be appreciated that this method can be applied to both open loop and closed-loop configurations. For the auto-tuning purposes, the test can be performed off-line and a step input, u(t)=constant can be applied. The LADRC does not require $b_0$ to be highly accurate because the difference, $b - b_0$, is treated as one of the sources of the disturbance estimated by LESO and cancelled by control law.

The $b_0$ obtained from the off-line estimation of b described above can be adapted for auto-tuning LADRC. An auto-tuning method includes, performing off-line tests to determine the order of the plant and $b_0$, selecting the order and the $b_0$ parameter of the LADRC using the results of the off-line tests, and performing a computerized auto-optimization.

Figure 13:
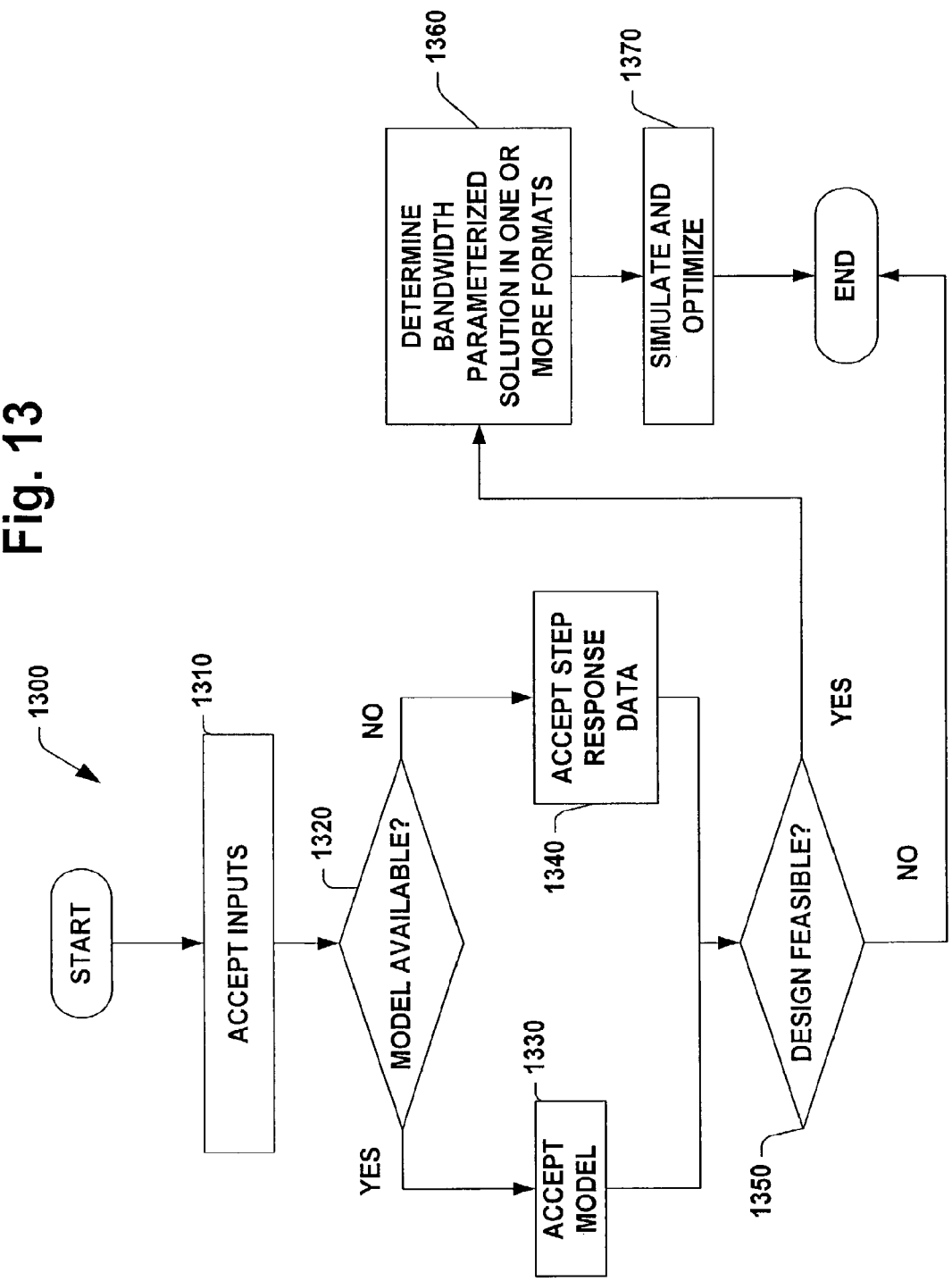
FIG. 13 is a flowchart of an example design method.

Using the controller scaling, parameterization and optimization techniques presented herein, an example computer implemented method 1300 as shown in FIG. 13 can be employed to facilitate automatically designing and optimizing the automatic controls (ADOAC) for various applications. The applications include, but are not limited to, motion control, thermal control, pH control, aeronautics, avionics, astronautics, servo control, and so on.

The method 1300, at 1310, accepts inputs including, but not limited to, information concerning hardware and software limitations like the actuator saturation limit, noise tolerance, sampling rate limit, noise levels from sensors, quantization, finite word length, and the like. The method also accepts input design requirements like settling time, overshoot, accuracy, disturbance attenuation, and so on. Furthermore, the method also accepts as input the preferred control law form like, PID form, model based controller in a transfer function form, and model independent LADRC form. In one example, the method can indicate if the control law should be provided in a difference equation form. At 1320, a determination is made concerning whether a model is available. If a model is available, then at 1330 the model is accepted either in transfer function, differential equations, or state space form. If a model is not available, then the method may accept step response data at 1340. Information on significant dynamics that is not modeled, such as the resonant modes, can also be accepted.

Once the method has received information input, the method can check design feasibility by evaluating the specification against the limitations. For example, in order to see whether transient specifications are achievable given the limitations on the actuator, various transient profiles can be used to determine maximum values of the derivatives of the output base on which the maximum control signal can be estimated. Thus, at 1350, a determination is made concerning whether the design is feasible. In one example, if the design is not feasible, processing can conclude. Otherwise, processing can proceed to 1360.

If the input information passes the feasibility test, then at 1360, the method 1300 can determine an $\omega_c$ parameterized solution in one or more formats. In one example, the $\omega_c$ solution can then be simulated at 1370 to facilitate optimizing the solution.

In one example, to assist an engineer or other user, the ADOAC method provides parameterized solutions of different kind, order, and/or forms, as references. The references can then be ranked separately according to simplicity, command following quality, disturbance rejection, and so on to facilitate comparison.

Figure 14:
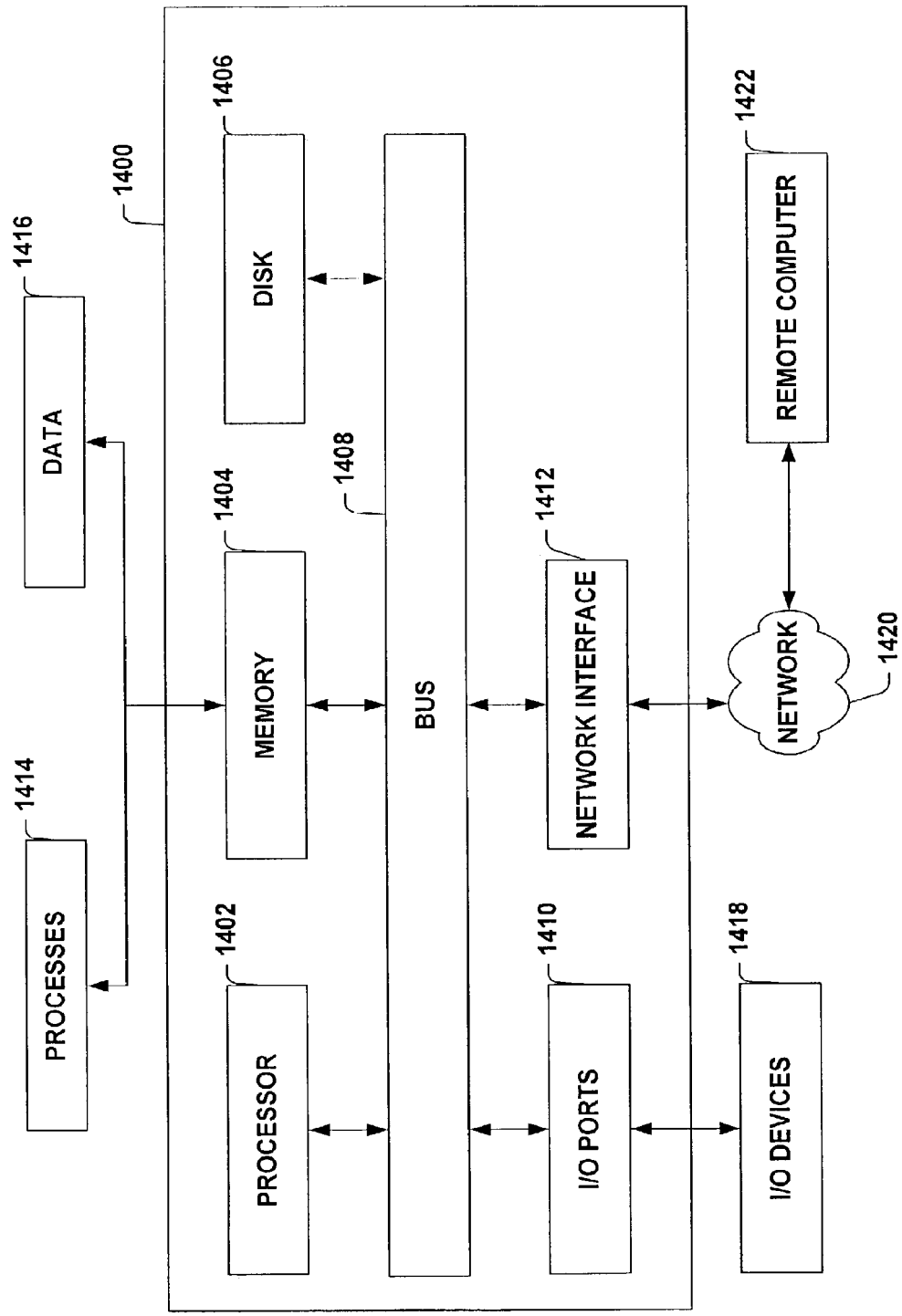
FIG. 14 is a schematic block diagram of an example computing environment.

FIG. 14 illustrates a computer 1400 that includes a processor 1402, a memory 1404, a disk 1406, input/output ports 1410, and a network interface 1412 operably connected by a bus 1408. Executable components of the systems described herein may be located on a computer like computer 1400. Similarly, computer executable methods described herein may be performed on a computer like computer 1400. It is to be appreciated that other computers may also be employed with the systems and methods described herein. The processor 1402 can be a variety of various processors including dual microprocessor and other multi-prbcessor architectures. The memory 1404 can include volatile memory and/or non-volatile memory. The non-volatile memory can include, but is not limited to, read only memory (ROM), programmable read only memory (PROM), electrically programmable read only memory (EPROM), electrically erasable programmable read only memory (EEPROM), and the like. Volatile memory can include, for example, random access memory (RAM), synchronous RAM (SRAM), dynamic RAM (DRAM), synchronous DRAM (SDRAM), double data rate SDRAM (DDR SDRAM), and direct RAM bus RAM (DRRAM). The disk 1406 can include, but is not limited to, devices like a magnetic disk drive, a floppy disk drive, a tape drive, a Zip drive, a flash memory card, and/or a memory stick. Furthermore, the disk 1406 can include optical drives like, compact disk ROM (CD-ROM), a CD recordable drive (CD-R drive), a CD rewriteable drive (CD-RW drive) and/or a digital versatile ROM drive (DVD ROM). The memory 1404 can store processes 1414 and/or data 1416, for example. The disk 1406 and/or memory 1404 can store an operating system that controls and allocates resources of the computer 1400.

The bus 1408 can be a single internal bus interconnect architecture and/or other bus architectures. The bus 1408 can be of a variety of types including, but not limited to, a memory bus or memory controller, a peripheral bus or external bus, and/or a local bus. The local bus can be of varieties including, but not limited to, an industrial standard architecture (ISA) bUs, a microchannel architecture (MSA) bus, an extended ISA (EISA) bus, a peripheral component interconnect (PCI) bus, a universal serial (USB) bus, and a small computer systems interface (SCSI) bus.

The computer 1400 interacts with input/output devices 1418 via input/output ports 1410. Input/output devices 1418 can include, but are not limited to, a keyboard, a microphone, a pointing and selection device, cameras, video cards, displays, and the like. The input/output ports 1410 can include but are not limited to, serial ports, parallel ports, and USB ports.

The computer 1400 can operate in a network environment and thus is connected to a network 1420 by a network interface 1412. Through the network 1420, the computer 1400 may be logically connected to a remote computer 1422. The network 1420 can include, but is not limited to, local area networks (LAN), wide area networks (WAN), and other networks. The network interface 1412 can connect to local area network technologies including, but not limited to, fiber distributed data interface (FDDI), copper distributed data interface (CDDI), ethernet/IEEE 802.3, token ring/IEEE 802.5, and the like. Similarly, the network interface 1412 can connect to wide area network technologies including, but not limited to, point to point links, and circuit switching networks like integrated services digital networks (ISDN), packet switching networks, and digital subscriber lines (DSL).

Figure 15:
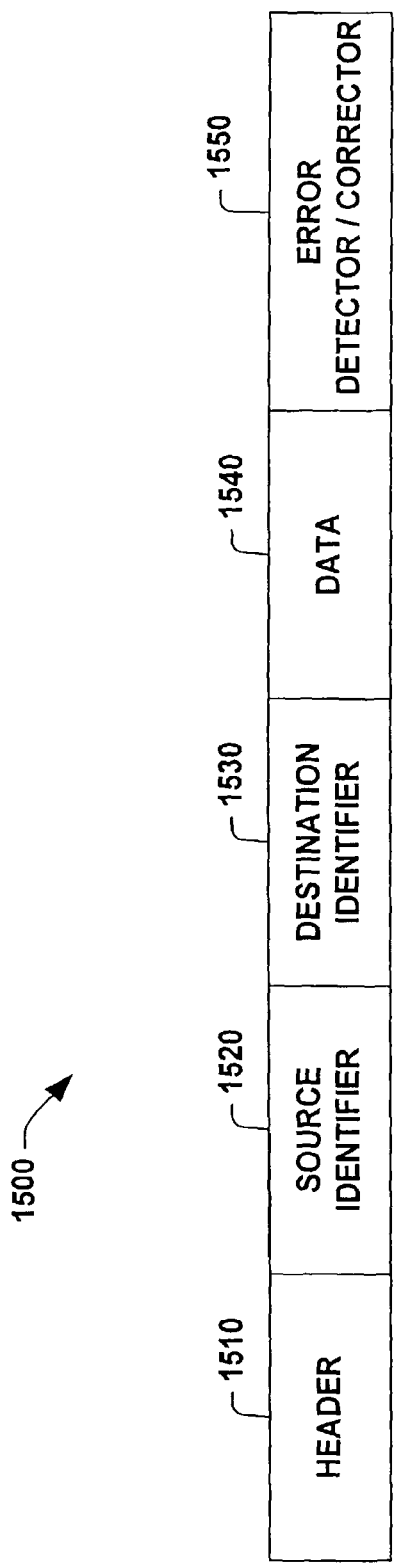
FIG. 15 illustrates a data packet.

Referring now to FIG. 15, information can be transmitted between various computer components associated with controller scaling and parameterization described herein via a data packet 1500. An exemplary data packet 1500 is shown. The data packet 1500 includes a header field 1510 that includes information such as the length and type of packet. A source identifier 1520 follows the header field 1510 and includes, for example, an address of the computer component from which the packet 1500 originated. Following the source identifier 1520, the packet 1500 includes a destination identifier 1530 that holds, for example, an address of the computer component to which the packet 1500 is ultimately destined. Source and destination identifiers can be, for example, globally unique identifiers (guids), URLS (uniform resource locators), path names, and the like. The data field 1540 in the packet 1500 includes various information intended for the receiving computer component. The data packet 1500 ends with an error detecting and/or correcting field 1550 whereby a computer component can determine if it has properly received the packet 1500. While six fields are illustrated in the data packet 1500, it is to be appreciated that a greater and/or lesser number of fields can be present in data packets.

Figure 16:
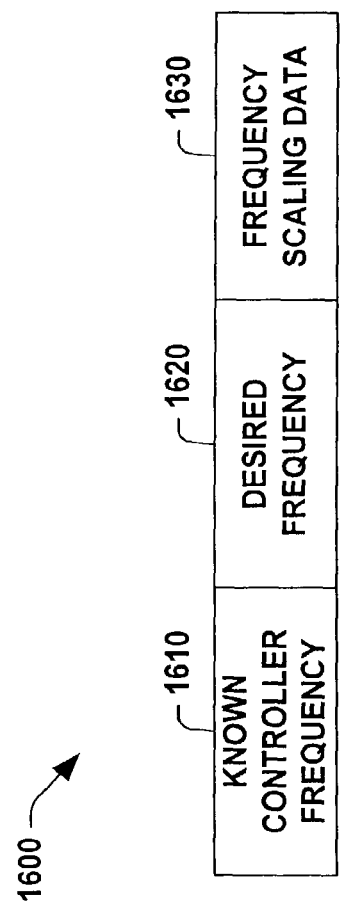
FIG. 16 illustrates sub-fields within a data packet.

FIG. 16 is a schematic illustration of sub-fields 1600 within the data field 1540 (FIG. 15). The sub-fields 1600 discussed are merely exemplary and it is to be appreciated that a greater and/or lesser number of sub-fields could be employed with various types of data germane to controller scaling and parameterization. The sub-fields 1600 include a field 1610 that stores, for example, information concerning the frequency of a known controller and a second field 1620 that stores a desired frequency for a desired controller that will be scaled from the known controller. The sub-fields 1600 may also include a field 1630 that stores a frequency scaling data computed from the known frequency and the desired frequency.

Figure 17:
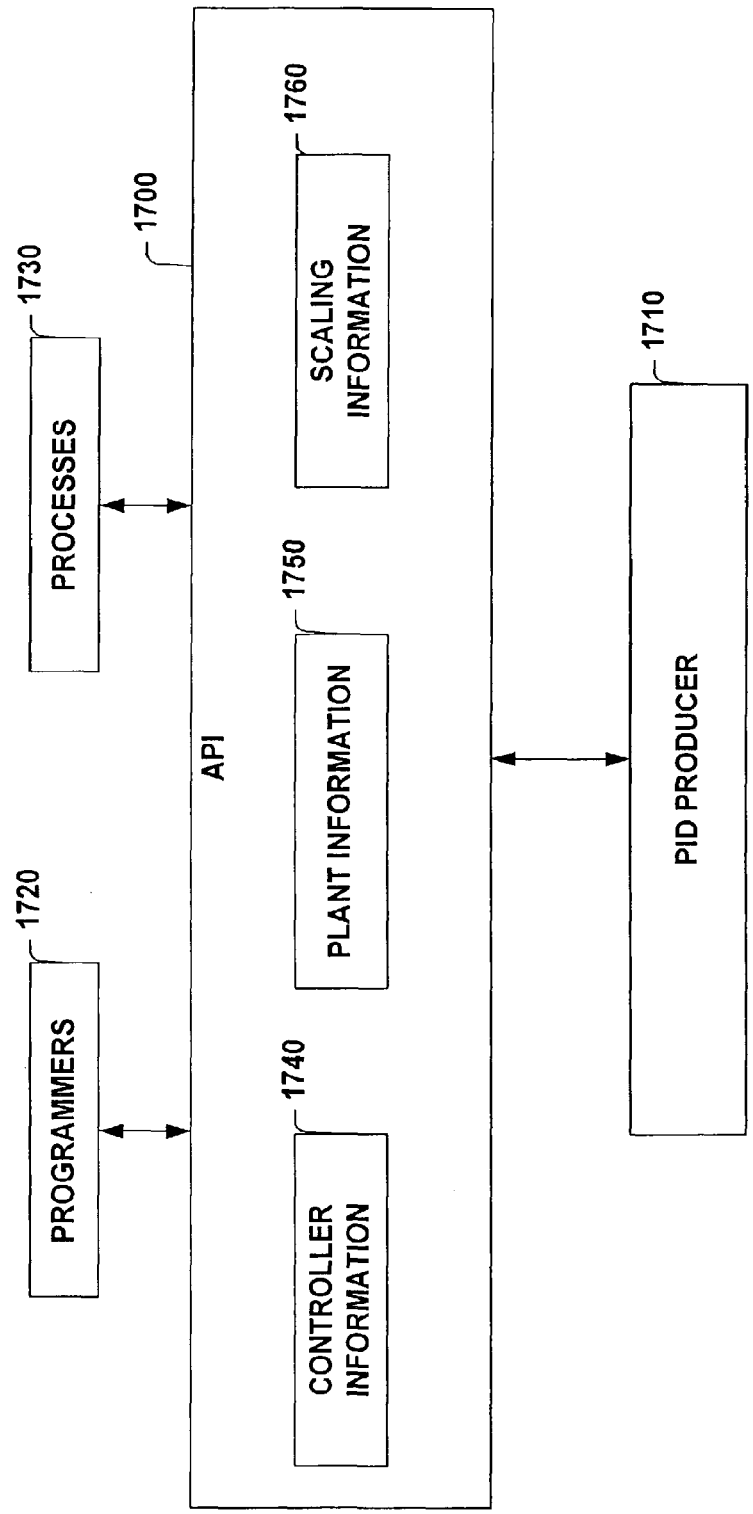
FIG. 17 illustrates an API.

Referring now to FIG. 17, an application programming interface (API) 1700 is illustrated providing access to a system 1710 for controller scaling and/or parameterization. The API 1700 can be employed, for example, by programmers 1720 and/or processes 1730 to gain access to processing performed by the system 1710. For example, a programmer 1720 can write a program to access the system 1710 (e.g., to invoke its operation, to monitor its operation, to access its functionality) where writing a program is facilitated by the presence of the API 1700. Thus, rather than the programmer 1720 having to understand the internals of the system 1710, the programmer's task is simplified by merely having to learn the interface to the system 1710. This facilitates encapsulating the functionality of the system 1710 while exposing that functionality. Similarly, the API 1700 can be employed to provide data values to the system 1710 and/or retrieve data values from the system 1710.

For example, a proceSs 1730 that retrieves plant information from a data store can provide the plant information to the system 1710 and/or the programmers 1720 via the API 1700 by, for example, using a call provided in the API 1700. Thus, in one example of the API 1700, a set of application program interfaces can be stored on a computer-readable medium. The interfaces can be executed by a computer component to gain access to a system for controller scaling and parameterization. Interfaces can include, but are not limited to, a first interface 1740 that facilitates communicating controller information associated with PID production, a second interface 1750 that facilitates communicating plant information associated with PID production, and a third interface 1760 that facilitates communicating frequency scaling information generated from the plant information and the controller information.

The systems, methods, and objects described herein may be stored, for example, on a computer readable media. Media can include, but are not limited to, an ASIC, a CD, a DVD, a RAM, a ROM, a PROM, a disk, a carrier wave, a memory stick, and the like. Thus, an example computer readable medium can store computer executable instructions for one or more of the claimed methods.

What has been described above includes several examples. It is, of course, not possible to describe every conceivable combination of components or methodologies for purposes of describing the systems, methods, computer readable media and so on employed in scaling and parameterizing controllers. However, one of ordinary skill in the art may recognize that further combinations and permutations are possible. Accordingly, this application is intended to embrace alterations, modifications, and variations that fall within the scope of the appended claims. Furthermore, the preceding description is not meant to limit the scope of the invention. Rather, the scope of the invention is to be determined only by the appended claims and their equivalents.

While the systems, methods and so on herein have been illustrated by describing examples, and while the examples have been described in considerable detail, it is not the intention of the applicants to restrict or in any way limit the scope of the appended claims to such detail. Additional advantages and modifications will be readily apparent to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A graphical interface for interacting with a controller of an Nth order closed-loop system, comprising:
a first input field configured to receive first input that adjusts a control system bandwidth $\omega_c$ of a parameterized controller embodied on a processor, wherein
the control system bandwidth $\omega_c$ is a sole control tuning parameter of two or more gains of the parameterized controller and defines a common location of N poles of a Nth order closed-loop system comprising the parameterized controller and a plant controlled by the parameterized controller, where N is an integer, and wherein adjustment of the control system bandwidth $\omega_c$ in accordance with the first input causes adjustment of the N poles of the Nth order closed-loop system, and
the two or more gains are represented by respective two or more functions wherein an only variable of the respective two or more functions is the sole control tuning parameter;
a first display field configured to display at least one performance parameter of the Nth order closed-loop system; and
one or more second input fields configured to receive second input specifying one or more design objectives for control of the plant, wherein the graphical interface is configured to set an initial value for the control system bandwidth $\omega_c$ based at least in part on the one or more design objectives.

2. The graphical interface of claim 1, further comprising:
a third input field configured to receive third that adjusts an observer bandwidth $\omega_o$ of a state observer having an observer gain that is a function of the observer bandwidth $\omega_o$.

3. The graphical interface of claim 1, wherein the parameterized controller is a proportional/integral/derivative (PID) controller having at least one of a proportional gain, an integral gain, or a derivative gain that is a function of the control system bandwidth $\omega_c$.

4. The graphical interface of claim 1, further comprising one or more third input fields configured to receive third input identifying a model of the plant.

5. The graphical interface of claim 4, further comprising:
a controller identifier configured to retrieve, in response to receiving the third input, a controller model from a data store of controller classes, the controller model comprising at least one scalable controller parameter; and
a controller scaler configured to produce a scaled controller by scaling the scalable controller parameter based on the model of the plant.

6. The graphical interface of claim 5, wherein the at least one scalable controller parameter comprises at least one of a frequency or a gain.

7. A method for interfacing with a controller, comprising:
receiving, via one or more first input fields, first input representing one or more design objectives relating to a parameterized controller embodied on a processor and having two or more gains that are functions of a single tuning parameter, wherein the single tuning parameter is the control system bandwidth $\omega_c$, and the control system bandwidth $\omega_c$ defines a common location of N poles of an Nth order closed-loop system comprising the parameterized controller and a plant controlled by the parameterized controller, where N is an integer;

setting an initial value for the control system bandwidth $\omega_c$ as a function of at least the first input;

receiving, via a second input field, second input that modifies the initial value of the control system bandwidth, wherein modification of the initial value causes adjustment of the N poles of the Nth order closed-loop system; and displaying, via a first output field, first output representing at least one performance parameter of the Nth order closed loop system.

8. The method of claim 7, further comprising modifying the common location of the N poles in accordance with the first input in response to the receiving the first input.

9. The method of claim 7, further comprising:
receiving, via a third input field, third input that modifies a value of an observer bandwidth $\omega_o$ of a state observer, wherein the state observer has an observer gain that is a function of the observer bandwidth $\omega_o$.

10. The method of claim 7, further comprising receiving, via a third input field, third input identifying a model of the plant.

11. The method of claim 10, further comprising retrieving, in response to receiving the third input, a controller model from a data store of controller classes, wherein the controller model comprises at least one scalable controller parameter.

12. The method of claim 11, further comprising:
displaying, via a second output field, second output identifying a scaled controller generated by scaling the at least one scalable control parameter of the control model based on the model of the plant.

13. The method of claim 12, wherein the displaying the second output comprises displaying at least one of a scaled frequency or a scaled gain of the scaled controller.

14. A graphical interface for interacting with a controller, comprising:
a first input field configured to receive first input that changes a value of a control system bandwidth $\omega_c$ of a parameterized controller embodied on a processor and having two or more gains represented by respective two or more functions for which an only variable is a single tuning parameter, wherein:
the control system bandwidth $\omega_c$ defines a common location of N poles of an Nth order closed loop system comprising the parameterized controller and a plant controlled by the parameterized controller, where N is an integer, and
the single tuning parameter is the control system bandwidth $\omega_c$, and adjustment of the control system bandwidth $\omega_c$ causes adjustment of the N poles of the Nth order closed-loop system;
a first display field configured to display at least one performance metric of the Nth order closed-loop system; and
one or more second input fields configured to receive second input defining one or more design objectives for control of the plant, wherein the graphical interface is configured to set an initial value for the control system bandwidth $\omega_c$ based at least in part on the one or more design objectives.

15. The graphical interface of claim 14, further comprising a third input field configured to receive third input that changes a value of an observer bandwidth $\omega_o$ of a state observer, wherein the state observer has an observer gain that is a function of the observer bandwidth $\omega_o$.

16. The graphical interface medium of claim 14, further comprising:
a third input field configured to receive third input identifying a model of the plant; and
a second display field configured to display information relating to a scaled controller generated by scaling at least one scalable control parameter of a control model based on the model of the plant.

17. The graphical interface of claim 14, wherein the parameterized controller is a proportional/integral/derivative (PID) controller having at least one of a proportional gain, an integral gain, or a derivative gain that is a function of the control system bandwidth $\omega_c$.

18. The method of claim 12, further comprising scaling, as the at least one scalable control parameter, at least one of a frequency or a gain.

19. The graphical interface of claim 16, wherein the control model is selected from a data store of controller classes based on the third input.

20. The graphical interface of claim 16, wherein the at least one scalable control parameter comprises at least one of a frequency or a gain.

* * * * *